May 7, 1968 D. V. CHENOWETH 3,381,749
MULTIPLE INJECTION PACKERS
Filed Sept. 7, 1965 9 Sheets-Sheet 1

INVENTOR.
DAVID V. CHENOWETH
By Bernard Kriegel
ATTORNEY.

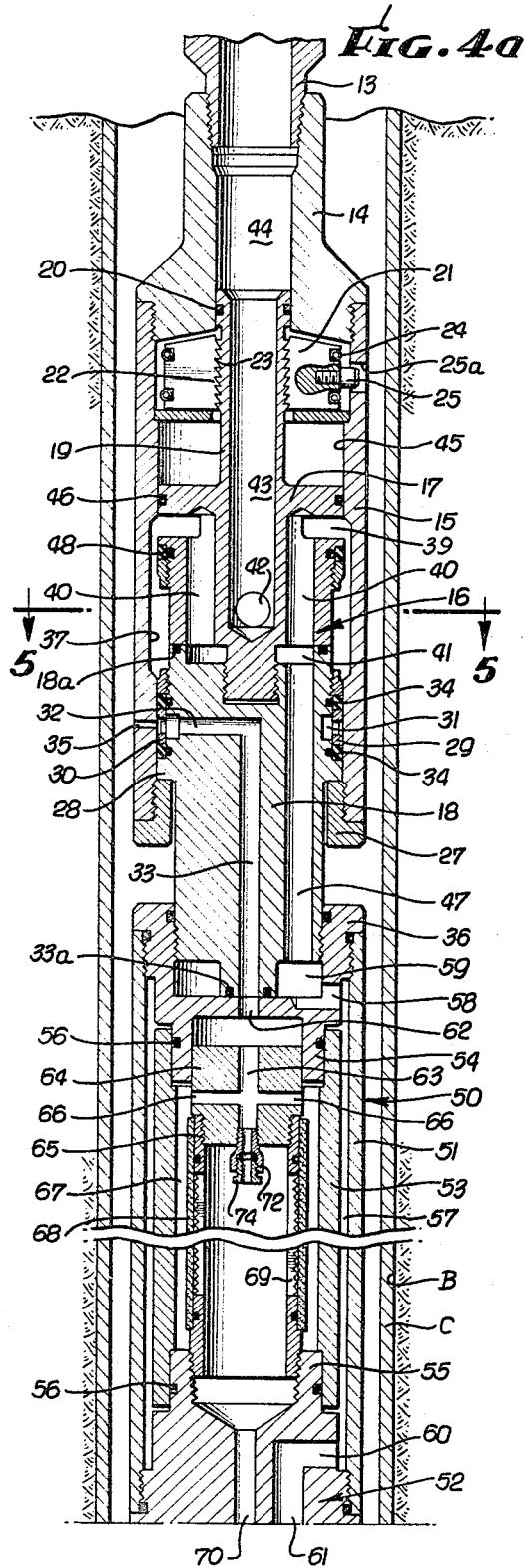
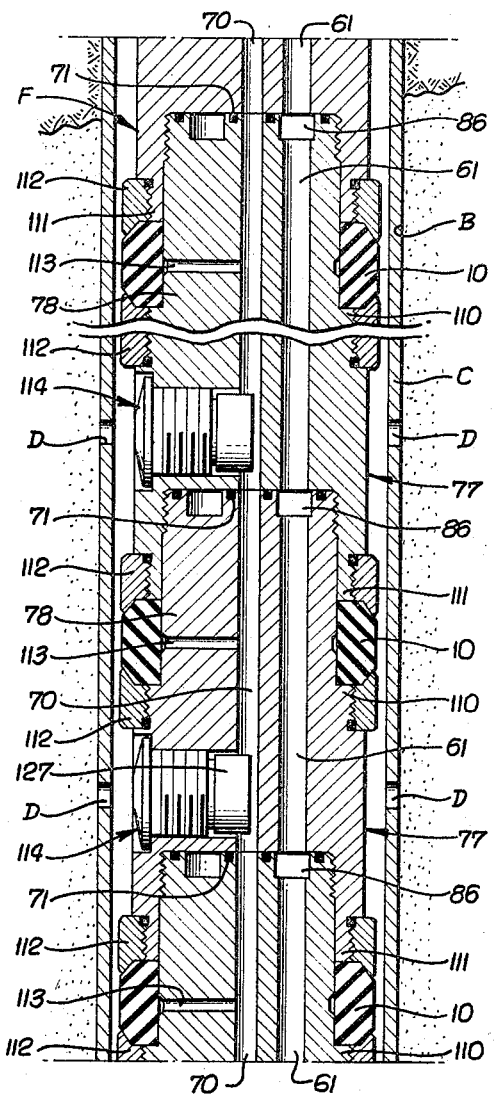

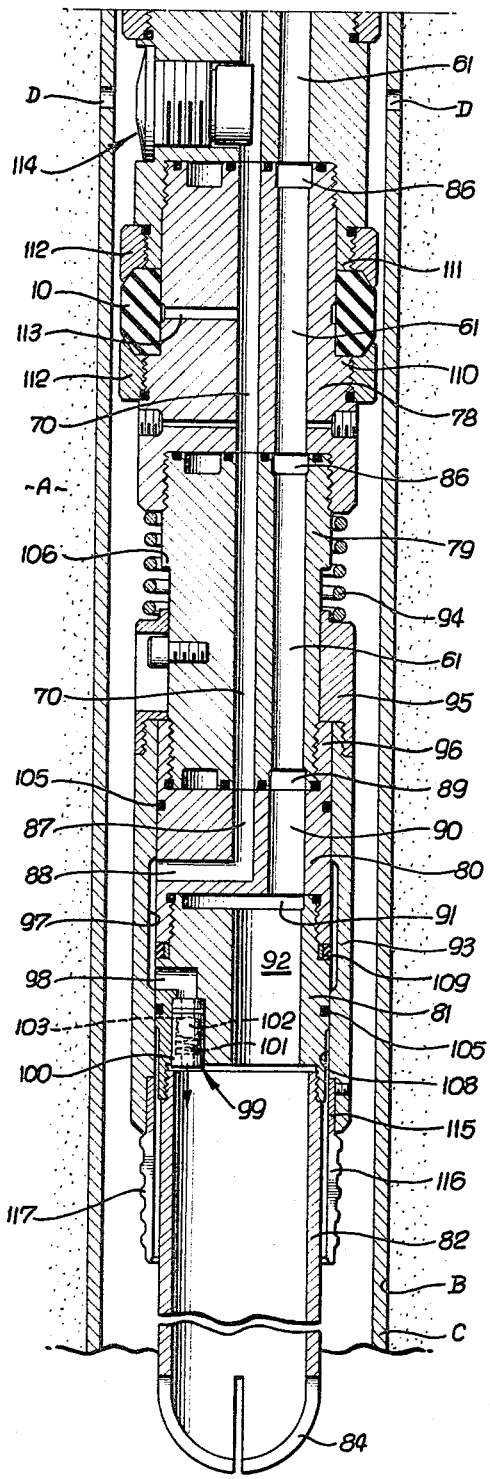
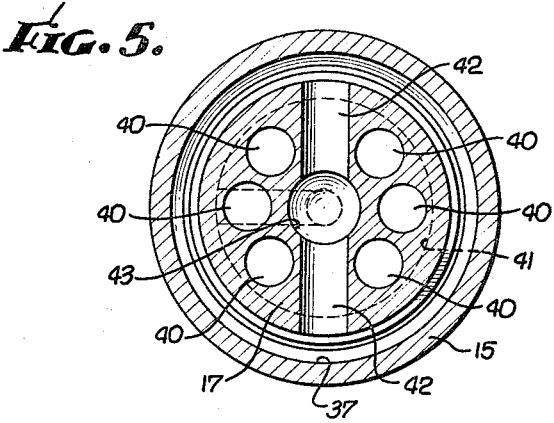
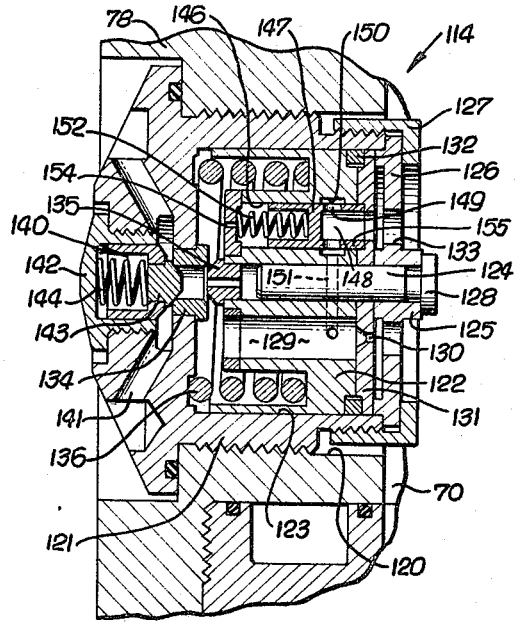

May 7, 1968 D. V. CHENOWETH 3,381,749
MULTIPLE INJECTION PACKERS

Filed Sept. 7, 1965 9 Sheets-Sheet 4

INVENTOR.
DAVID V. CHENOWETH
By Bernard Kriegel
ATTORNEY.

May 7, 1968 D. V. CHENOWETH 3,381,749
MULTIPLE INJECTION PACKERS
Filed Sept. 7, 1965 9 Sheets-Sheet 5

INVENTOR.
DAVID V. CHENOWETH
By Bernard Kriegel
ATTORNEY.

May 7, 1968

D. V. CHENOWETH 3,381,749

MULTIPLE INJECTION PACKERS

Filed Sept. 7, 1965

INVENTOR.
DAVID V. CHENOWETH
BY Bernard Kriegel
ATTORNEY.

May 7, 1968  D. V. CHENOWETH  3,381,749
MULTIPLE INJECTION PACKERS

Filed Sept. 7, 1965  9 Sheets-Sheet 7

INVENTOR.
DAVID V. CHENOWETH
BY Bernard Kriegel
ATTORNEY.

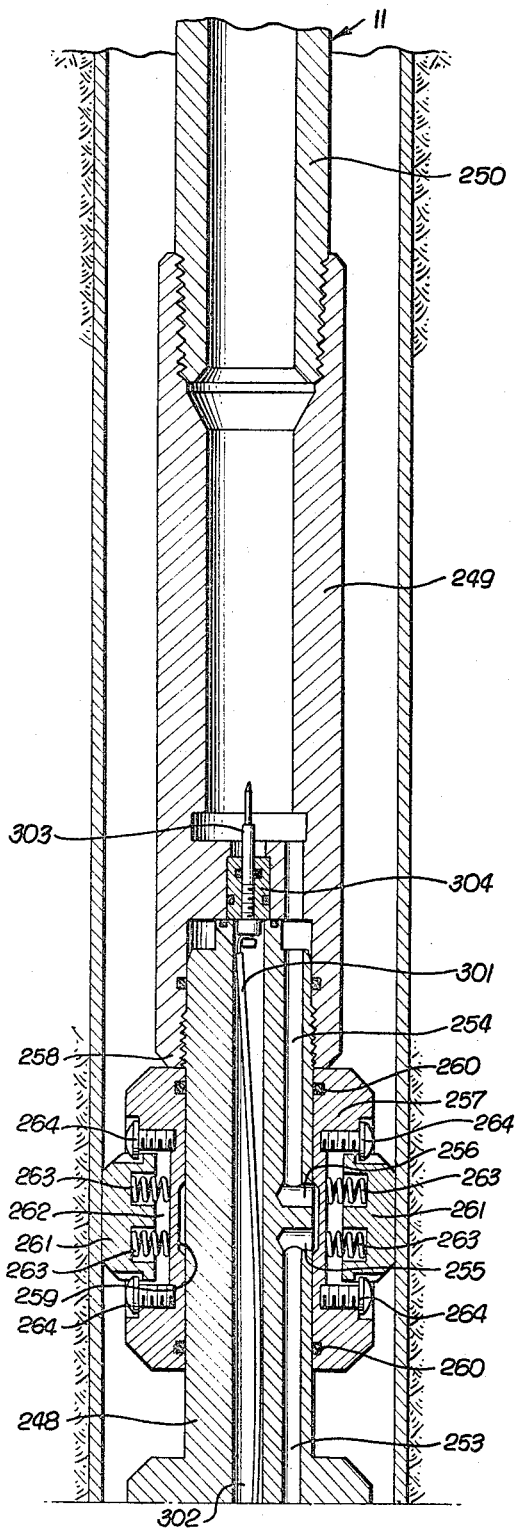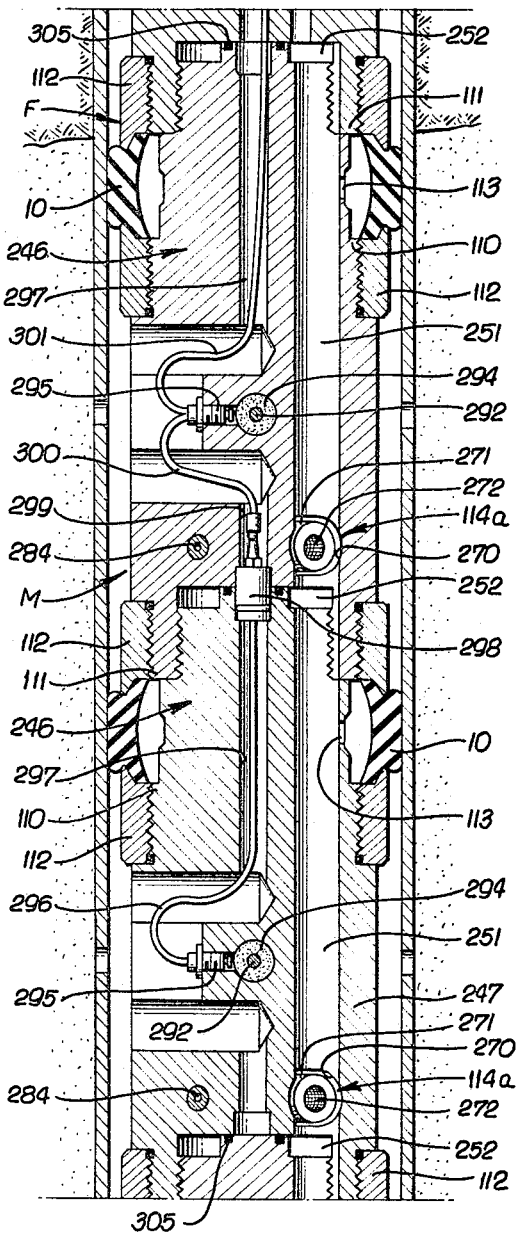

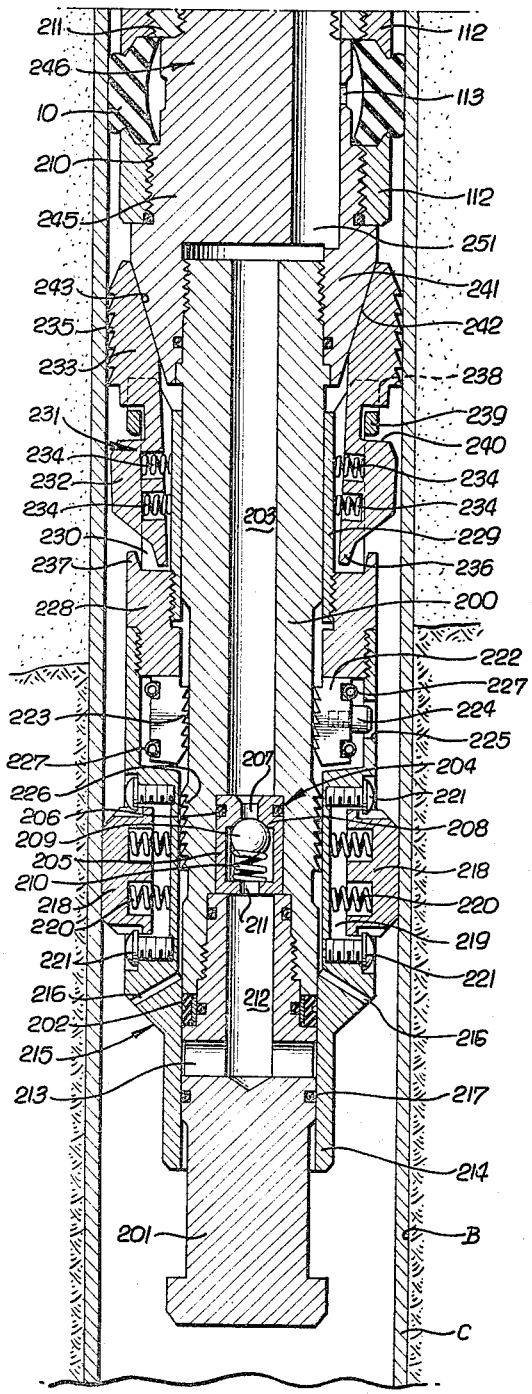
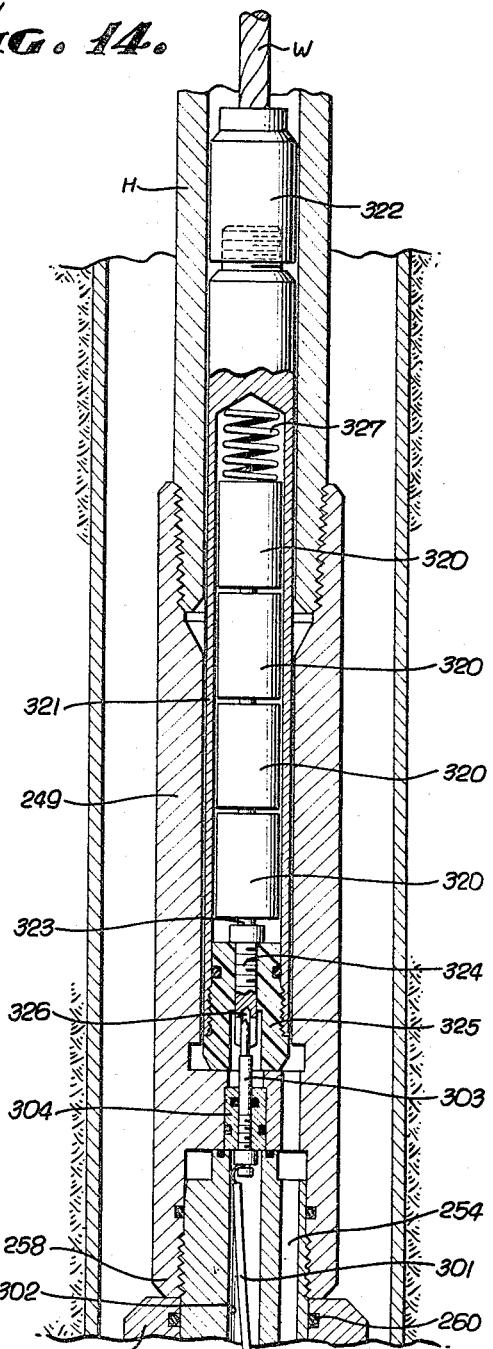

United States Patent Office 3,381,749
Patented May 7, 1968

3,381,749
MULTIPLE INJECTION PACKERS
David V. Chenoweth, Houston, Tex., assignor to Baker Oil Tools, Inc., Commerce, Calif., a corporation of California
Filed Sept. 7, 1965, Ser. No. 485,428
23 Claims. (Cl. 166—55)

ABSTRACT OF THE DISCLOSURE

Apparatus for injecting fluids into well bore formations in which a plurality of packings mounted on a body structure seal against the well casing to form a plurality of separated zones in the casing isolated from each other, the zones communicating with the surrounding formation through casing perforations located between the packings, the body structure having a fluid passage and a separate flow path leading therefrom to each zone, a flow regulator being disposed in each path to separately control the rate of flow therethrough to its associated zone.

---

The present invention relates to subsurface well bore apparatus, and more particularly to subsurface apparatus for injecting fluids into well bores, such as synthetic resins, water, steam, acids, etc.

In the injecting of fluids into a zone, or several zones, in a well bore by subjecting the fluids in the well bore to pressure, the desired injection of the fluids into the several regions of the same zone, or into different zones, is difficult to secure at the desired rate. Assuming a length of a formation zone is to be treated, it may break down at different pressures along its length, resulting in weaker regions of the zone receiving more of the injected fluid than other regions. The same situation prevails when separated zones are being treated simultaneously by injecting fluids thereinto. The weaker zones will receive more of the treating fluids than the stronger zones.

Accordingly, it is an object of the present invention to provide an apparatus for injecting fluids into a formation along a desired length, in which substantially the same amount of fluid will be injected along the length of the formation regardless of the fact that the breakdown pressures along the length of the formation might vary. If desired, the tool can be adjusted to inject the same amount of fluid into each interval of the formation being treated, or to deliver a different but known amount of fluid to each or any section of the treated interval.

In well bores that produce substantial quantities of sand, it is desirable to employ a sand consolidation process along the length of the producing formation. One such process includes the injection of a flushing fluid into the sand to displace most of the formation crude and brine, followed by the injection of acetone to miscibly displace the residual brine and the remaining crude. The sand near the injection area is then resaturated with diesel oil. A calculated volume of a synthetic resin, which may, for example, be an epoxy resin, is injected into the formation at a low rate, the resin fully saturating the interstices between the sand grains, because it has a greater viscosity than diesel oil, and preferentially wetting the sand grains. Diesel oil is again injected into the resin saturated sand and this oil immiscibly displaces the resin, leaving the sand grains covered with resin and the interstices filled with diesel oil. A diesel oil containing an activator is then injected into the sand, the activator reacting with the resin film on the sand surfaces to initiate polymerization or setting of the resin and the strong adherence of the sand grains to one another. The resulting sand body is strong and rigid, one having a high degree of permeability, but which is incapable of shifting into the well bore.

It is highly desirable to secure a substantially uniform injection of the various fluids into the well bore, regardless of the fact that the particular fluids being injected are of different viscosities. Accordingly, a further object of the present invention is to provide subsurface apparatus which is capable of injecting a desired volume of each fluid into the formation along a required length substantially uniformly along such length, and which is further capable of injecting fluids in such uniform manner despite the fact that the fluids having different degrees of viscosity are injected at different times into the formation.

A further object of the invention is to provide an apparatus of the type indicated that is not only capable of injecting fluids into the formation at selected intervals along its length, but which is also capable of perforating the well casing at the intervals into which the fluid or fluids are to be injected. Thus, the invention contemplates an apparatus capable of perforating the well casing, or other well conduit, and of effecting a pack-off or seal-off on opposite sides of each perforated region such that the perforated regions are isolated from one another, after which fluids can be pumped into the perforated regions at a controlled rate.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIGURES 1a and 1b together constitute a side elevational view of an apparatus embodying the invention disposed in a well casing located in a well bore, FIG. 1b being a lower continuation of FIG. 1a;

Figure 1A:
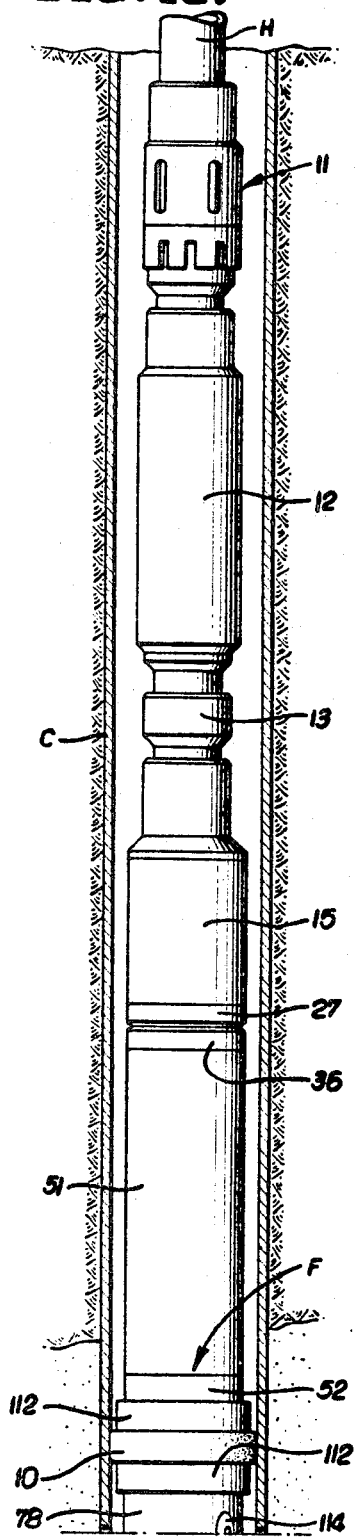
Figure 1B:
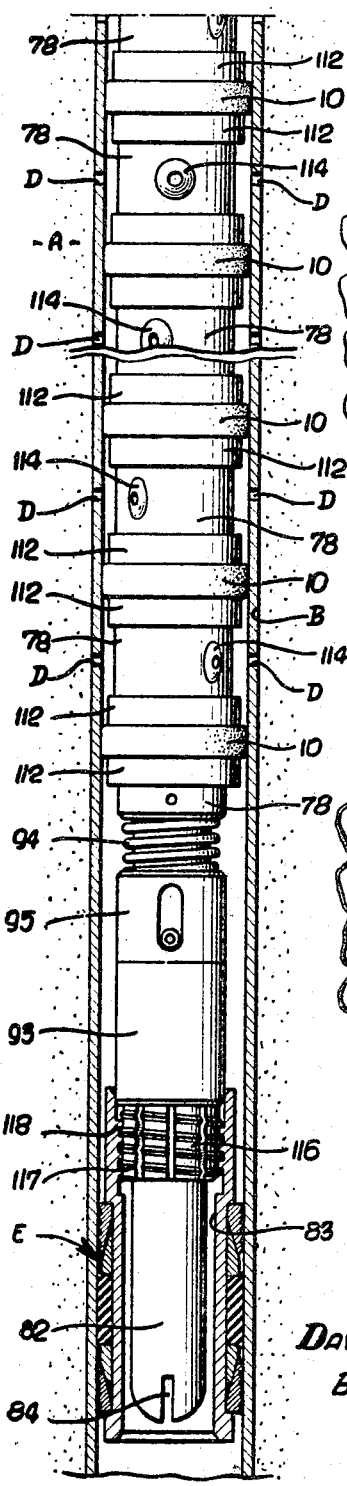
Figure 2:
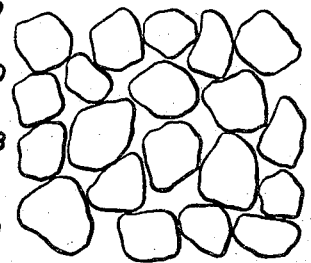
FIG. 2 is a diagrammatic representation of formation sand grains prior to the performance of a sand consolidation operation.
Figure 3:
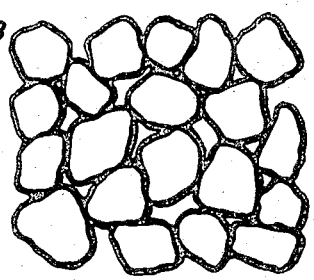
FIG. 3 is a view similar to FIG. 2 disclosing the sand formation after completion of the sand consolidation process.
Figure 7A:
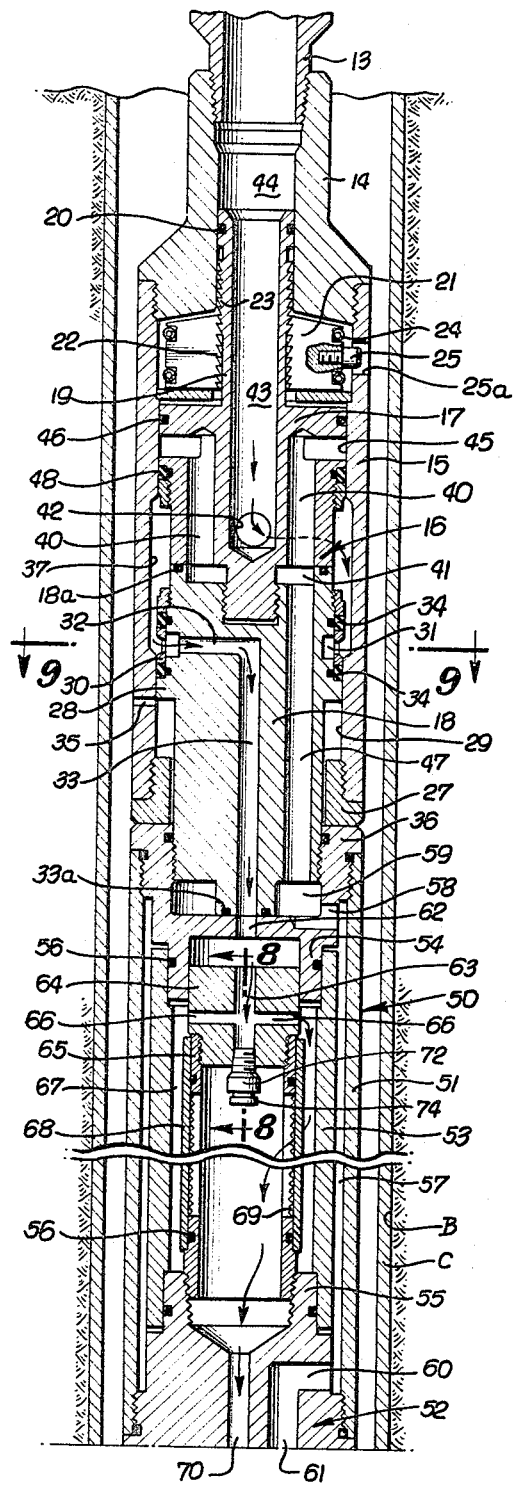
Figure 7B:
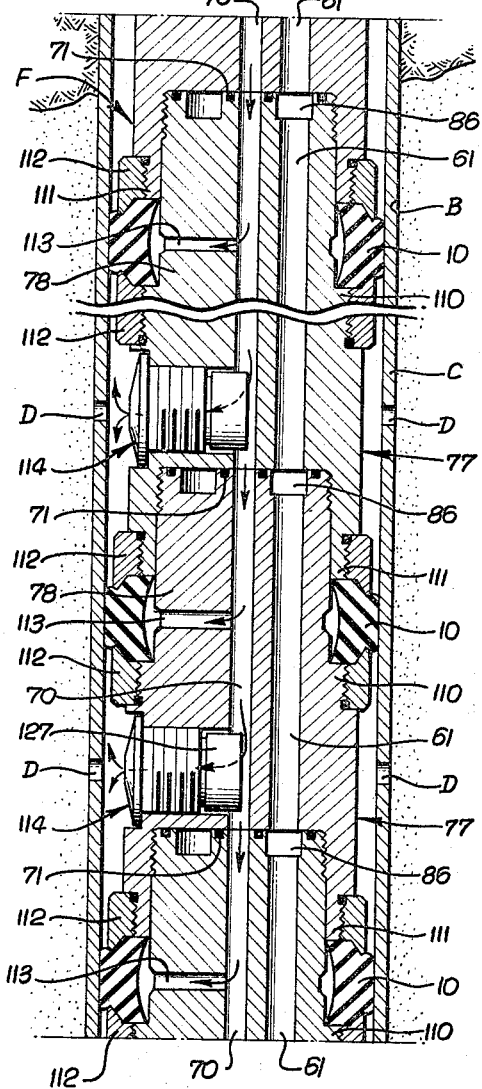
Figure 7C:
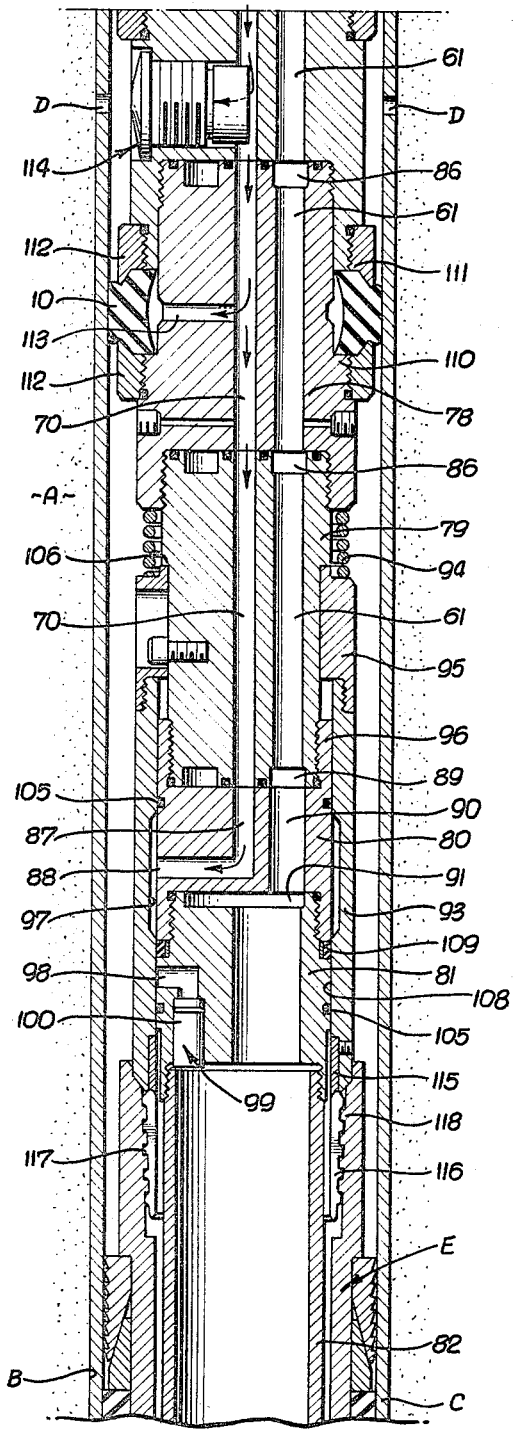
Figure 8:
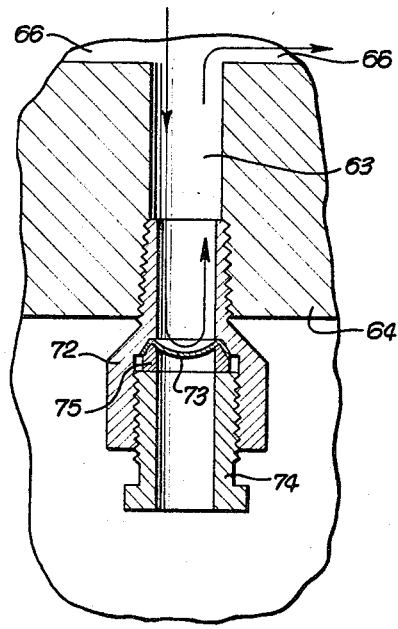
Figure 9:
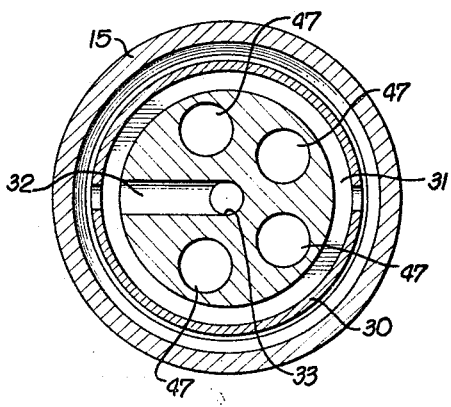
Figure 10A:
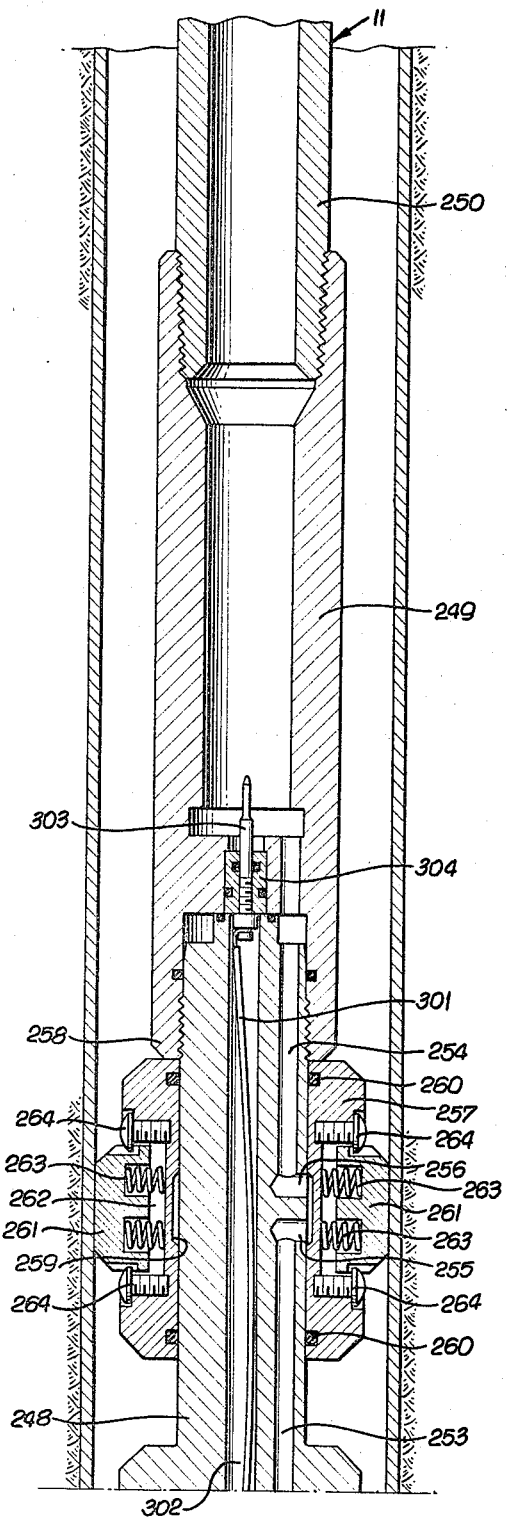
Figure 10B:
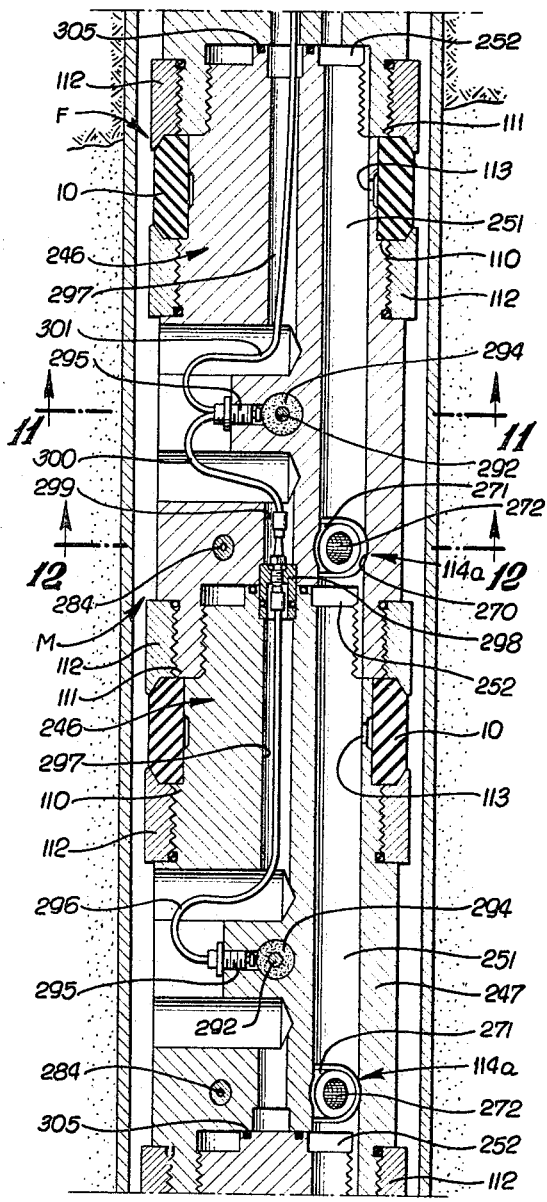
Figure 10C:
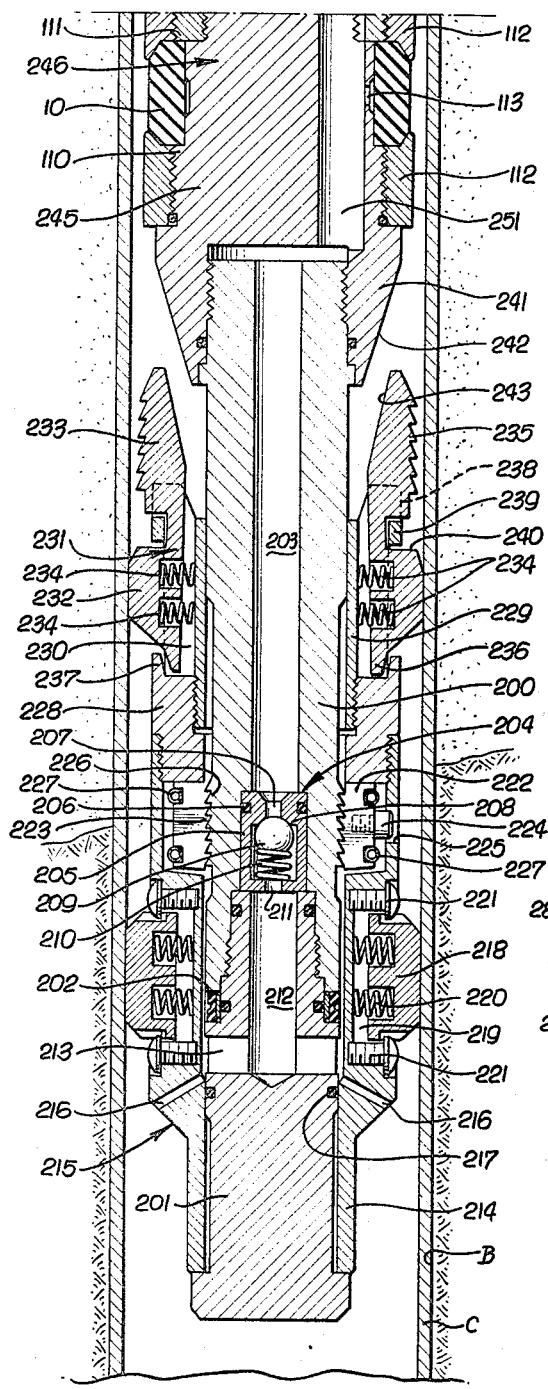
Figure 11:
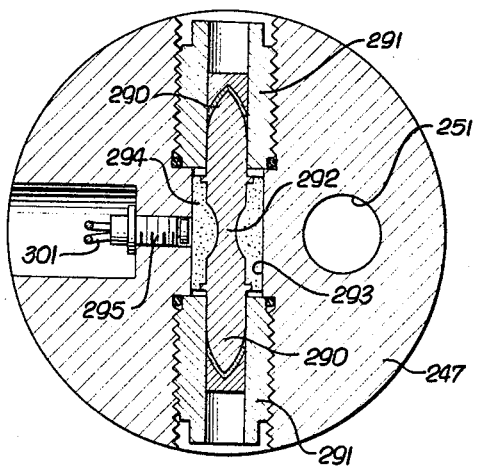
Figure 12:
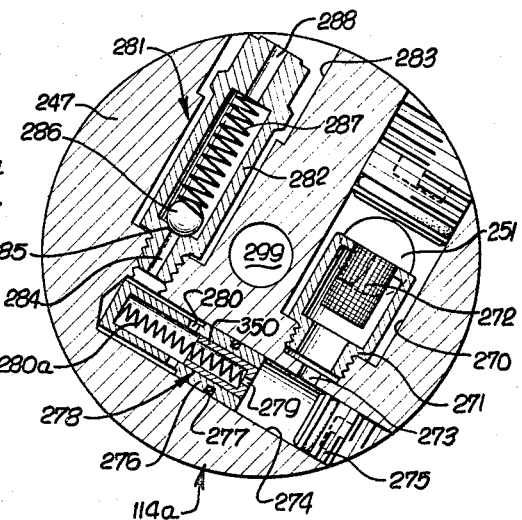

FIGS. 4a, 4b and 4c constitute a longitudinal section through the major portion of the apparatus illustrated in FIGS. 1a and 1b, with the several parts of the apparatus in the position they occupy when being movable through the well casing, FIGS. 4b and 4c being lower continuations of FIGS. 4a and 4b, respectively;

FIG. 5 is a cross-section taken along the line 5—5 on FIG. 4a;

FIG. 6 is an enlarged vertical section through one of the constant flow regulators forming part of the apparatus;

FIGS. 7a, 7b and 7c are views corresponding to FIGS. 4a, 4b and 4c, respectively, illustrating the apparatus in its set condition in the well casing straddling the perforations therein, FIGS. 7b and 7c constituting lower continuations of FIGS. 7a and 7b, respectively;

FIG. 8 is an enlarged vertical section through a safety pressure release portion of the apparatus taken along the line 8—8 on FIG. 7a;

FIG. 9 is a cross-section taken along the line 9—9 on FIG. 7a;

FIGS. 10a, 10b and 10c together constitute a longitudinal section through another embodiment of the invention, with the parts in the condition they occupy when being lowered in the well casing, FIGS. 10b and 10c being lower continuations of FIGS. 10a and 10b, respectively;

FIG. 11 is an enlarged cross-section taken along the line 11—11 on FIG. 10b;

FIG. 12 is an enlarged cross-section taken along the line 12—12 on FIG. 10b;

FIGS. 13a, 13b and 13c are views corresponding to FIGS. 10a, 10b and 10c, respectively, illustrating the apparatus set in packed-off condition in the well casing, FIGS. 13b and 13c being lower continuations of FIGS. 13a and 13b, respectively;

FIG. 14 is a view through the upper portion of the apparatus illustrated in FIG. 13a showing the mechanism for effecting firing of the perforating portions of the apparatus shown in FIGS. 10a to 13c, inclusive.

As illustrated in the drawings, it is desired to treat a formation zone A surrounding a well bore B along an extended length with a suitable fluid or fluids, and to secure a substantially uniform injection of the fluid or fluids into the formation zone, which, for example, may be a producing sand. A casing C extends into the well bore from the top thereof and through the producing sand A. As disclosed in the form of invention illustrated in FIGS. 1a to 9, inclusive, the casing has been perforated at predetermined points D along the producing zone in any suitable manner. As disclosed in FIGS. 1a and 1b, a suitable locator or well packer E has been previously set in the well casing a short distance below the location of the lowermost perforation D and such packer is used as a locator for a suitable perforating gun (not shown) which is lowered in the well casing and comes to rest on the packer. Bullets or shaped charges (not shown) are fired in salvo from the gun to produce the perforations or holes D through the casing at preselected spaced points along the producing zone A. Preferably, the perforations D are equally spaced from one another longitudinally of the well casing.

The injection apparatus F is then run in the well bore on a tubular string H. It will come to rest upon the locator or packer E and has packing units 10 thereon adapted to be expanded into sealing engagement with the well casing C on opposite sides of each set of perforations D through the well casing, so as to isolate them from one another. Thereafter, a suitable fluid is pumped down through the tubing string H and is discharged from the tool F into the well casing at locations between the expanded well packing elements 10, such fluid discharge being regulated to secure its appropriate distribution and injection through the perforations D and into the formation A.

As disclosed in FIG. 1, the injection apparatus F includes an upper unloader or valve 11 which will close when a downweight is imposed on the tubular string H. This unloader valve can be of any suitable and known type capable of transmitting torque through it to portions of the apparatus F therebelow. The lower end of the unloader valve 11 is secured to a screen assembly 12 of any suitable type capable of catching large particles in the fluid and to screen out the solid elements therefrom. The lower end of the screen assembly, in turn, is connected to a sub 13 threadedly attached to the upper end of the multiple injection packer portion of the tool F.

As disclosed in FIGS. 4a to 9, the multiple injection packer includes an upper head 14 threadedly secured to the sub 13, this head, in turn, being threadedly secured to an upper valve sleeve 15 encompassing a valve body 16 comprising an upper section 17 threadedly secured to a lower section 18, a gasket seal 18a preventing leakage between them. The upper section includes a stem 19 projecting upwardly into the head 14, leakage of fluid between the stem and head being prevented by a suitable side seal ring 20. Relative downward movement of the head 14 and valve sleeve 15 along the valve body 16 is initially prevented by a control device in the form of a plurality of clutch segments 21 within the sleeve having downwardly facing internal ratchet teeth 22, of thread form, adapted to mesh with companion upwardly facing external ratchet teeth 23, of thread form, on the stem 19. These segments are urged inwardly to releasably retain their ratchet thread 22 meshed with the ratchet thread 23 of the stem by one or a plurality of encompassing bellyband coil springs 24. Rotation of the upper valve sleeve 15 is transmitted to the control or clutch segments 21 by one or a plurality of radial cap screws 25 threadedly secured to one or more of the segments and each extending into a slot or opening 25a in the sleeve. The ratchet teeth 22 on the clutch segments and the companion external teeth 23 on the stem are in the form of right-hand threads so that right-hand rotation of the clutch segments relative to the stem will feed the clutch segments downwardly of the stem and will correspondingly feed the upper valve sleeve 15 downwardly along the valve body 16.

Initially, the valve sleeve 15 occupies an upper position with respect to the valve body 16, as determined by engagement of a lower stop ring 27 threadedly secured to the sleeve with a downwardly facing body shoulder 28. When in this condition, a lower cylindrical sealing surface 29 of the valve sleeve extends across a ported ring 30 opening into a circumferential groove 31 in the valve body that communicates with a lateral passage 32 opening into a central injection passage 33 of the valve body 16. Suitable side seal rings 34 are disposed on opposite sides of the ring 30 and groove 31 and are adapted to sealingly engage the cylindrical surface 29. With the sleeve in the position just referred to, the injection passage 32, 33 communicates with the well bore externally of the sleeve through a lateral port 35 extending through the sleeve.

When the sleeve 15 and the control or clutch segments 21 have been rotated to the right to feed the sleeve 15 downwardly to a position in which the stop ring 27 engages the upper end of a head 36 threadedly secured to the lower portion of the valve body 16, the side port 35 is disposed below the lower seal 34 (FIG. 7a) and an enlarged bore 37 of the sleeve communicates with the port ring 30, groove 31 and port 32 in the valve body, the lower seal 34 still being in sealing engagement with the lower cylindrical sealing surface 29. With the sleeve 15 in its upper position (FIG. 4a), the enlarged bore 37 has its upper portion communicating with a circumferential groove 39 in the upper valve body section 17 that opens into a plurality of longitudinal passages 40 extending downwardly into a groove 41 formed between the upper and lower valve body sections 17, 18. The enlarged bore 37 also communicates with a pair of diametrically opposed radial ports 42 in the upper valve body section opening into the central passage 43 through the valve body section 17 and its stem 19 that extends upwardly to the passage 44 through the upper head 14 secured to the sub 13. The upper valve sleeve 15 also has an upper cylindrical sealing surface 45 engageable with the periphery of the upper valve body section 17, leakage between the two being prevented by a suitable seal ring 46 on the head engaging the cylindrical surface 45.

When the valve sleeve 15 is in the upper position with respect to the valve body 16, as disclosed in FIG. 4a, communication is established between the central passage 43 and the longitudinal passages 41 through the radial ports 42, enlarged bore 37 and groove 39, these longitudinal passages being communicable with a circulation passage 47 extending downwardly through the lower valve body section 18. At this time, the side port 35 of the sleeve 15 communicates with the injection passage 33.

Upon downward shifting of the valve sleeve 15 along the valve body 16 as a result of its rotation, the cylindrical surface 45 shifts into sealing engagement with an upper seal 48 on the body 16 to prevent communication between the enlarged bore 37 and the longitudinal passages 41. Instead, the enlarged bore 37 is then in communication with the radial port 32 and the injection passage 33, as disclosed in FIG. 7a, so that fluids can then pass from the central passage 43 through the radial ports 42 into the enlarged bore 37, then flowing through the side port 32 into the injection passage 33.

The lower portion of the valve body 16 is secured to a filter screen device 50. As shown, it is threadedly attached to the upper head 36, which is, in turn, threadedly secured to the upper end of a bypass or circulation sleeve 51, the lower end of which is threadedly secured to a lower head or adapter 52. The fluid filtering mechanism is located within the bypass sleeve 51. As shown, it includes a filter housing 53 having its upper end fitting over the lower portion 54 of the adapter or head 36, and its lower portion fitted over the upper end 55 of the lower adapter or head 52, leakage of fluid between the housing and the upper and lower adapters being prevented by suitable side seal rings 56 mounted on the adapters 36, 52.

The filter housing 53 is spaced inwardly from the inner wall of the bypass sleeve 51 to provide a circumferential circulation or bypass passage 57 therebetween, the upper end of which communicates with an upper port 58 leading into a circumferential groove 59 formed from between the upper head 36 and the valve body section 18. The lower end of the bypass 57 communicates with a side port 60 leading into a circulation passage 61 extending downwardly through the lower adapter or head 52. The lower end of the injection passage 33 through the upper valve body 16 communicates with a passage 62 extending through the upper adapter 36, such fluid being capable of passing into a central passage 63 through a filter adapter 64 disposed in the upper head 36 and threadedly attached to a filter mandrel 65, the lower end of which is threadedly secured within the lower adapter 52. The filter adapter 64 has radial ports 66 extending from its central passage 63 and opening into an annular space 67 between the filter mandrel 65 and housing 53, such fluid flowing through a filter element or screen 68 surrounding the mandrel 65 and in through a plurality of longitudinal slots or perforations 69 to the interior of the mandrel, from which the fluid can flow downwardly through an injection passage 70 extending through the lower head 52. Leakage of fluid between the valve body 16 and upper adapter 36 is prevented by a suitable gasket ring 33a surrounding the injection passage 33.

The lower end of the central passage 63 through the filter adapter 64 is normally closed by a disruptable device. As shown in FIG. 8, a tubular member 72 is threaded into the lower end of the filter adapter 64, its passage being closed by a rupturable disc 73 clamped against the member by a nut 74 threadedly secured therewithin and bearing against a clamp ring 75. The rupturable disc 73 will only break at a comparatively high pressure, and will prevent any fluid from passing centrally downwardly through the filter adapter 64, causing the fluid to flow through the radial ports 66 into the filter housing 53, then passing through the filter screen 68 to the interior of the filter mandrel 65. It is only in the event the screen 68 becomes plugged that a sufficient pressure differential can be exerted on the disc 73 to rupture it and thereby open the central passage 63 leading directly into the filter mandrel 65.

The lower adapter 52 is secured to the uppermost of a series of interconnuected modules 77 that embody the packing elements 10 for sealing against the well casing on opposite sides of each set of casing perforations D. The uppermost module has the upper end of its body 78 piloted within and threadedly secured to the lower portion of the lower head 52, each module, in descending order, being piloted over and threadedly secured to the upper end of the body portion 78 of the module therebelow. The body of the lowermost module (FIG. 4c) is disposed over and is threadedly secured to a lower valve adapter 79, which is threadedly secured to the upper end of an upper valve body section 80, which is, in turn, threadedly secured to a lower valve body section 81 attached to the upper end of a tubular extension 82 adapted to extend into the central passage 83 through the locator, this tubular extension having suitable slots 84 in its lower portion to permit passage of fluid therethrough.

Each module body 78 has a circulation passage 61 therein and an injection passage 70 therein, which are adapted to communicate with one another. Thus, the lower end of an injection passage 70, each of which is disposed axially or centrally of the body 78, communicates with the upper end of an adjacent passage 70, leakage of fluid between the module bodies 78 being prevented by a suitable gasket seal 71. The lower end of each circulation passage 61 opens into a circumferential circulation groove 86 in the upper end of the body 78 therebelow, which communicates with the circulation passage 61 in such lower body. Although the circulation passages 61 are disclosed in the drawings in alignment with one another, for convenience of illustration, the threaded attachment of the body members 78 to one another would probably result in the circulation passages being out of alignment, but still in communication with each other because of the intervening circulation grooves 86. In a similar fashion, the circulation passage 61 of the lowermost module body communicates with a circular passage 86 in the upper end of the lower valve adapter 79, the latter having an injection passage 70 therein communicating with the injection passage of the module body thereabove. The lower end of this injection passage communicates with a similar passage 87 in the upper section of the lower valve body that opens into a lateral port 88 extending to the periphery of the valve body 80. The circulation passage 61 opens into a circumferential groove 89 in the lower portion of the lower valve adapter 79, which communicates with a circulation passage 90 in the upper valve body section 80 that, in turn, opens into a bore 91 in the upper end of the lower valve body section 81 that has a circulation passage 92 therethrough opening into the tubular extension 82.

The ability of fluid to flow in a downward direction out of the lowermost portion of the injection passages 70, 87, 88 is under the control of a lower valve sleeve 93 slidably mounted on the lower valve body 80, 81 and urged in a downward direction by a helical compression spring 94 surrounding the adapter 79, with its upper end bearing against the lowermost module body 78 and its lower end against a sleeve head 95 threadedly attached to the lower valve sleeve. The downward position of the valve sleeve 93 on the valve body is limited by engagement of the valve head 95 with an upwardly facing stop shoulder 96 on the upper valve body section 80. When the valve sleeve is in this condition, the radial or lateral injection port 88 through the upper valve body section opens into an enlarged bore 97 in the sleeve, the lower end of which then communicates with a passage 98 in the lower valve body controlled by a downwardly opening check valve 99. As shown, a check valve body 100 is suitably secured in the lower valve body 81, containing a spring 101 tending to urge a ball check valve 102 upwardly into engagement with a companion seat 103. Downward flow of fluid of a sufficient pressure can disengage the ball valve 102 from its seat, the fluid then flowing through the check valve 99 into the tubular extension 82.

When the valve sleeve 93 is in the position illustrated in FIG. 4c leakage of fluid between the valve body 80, 81 and the sleeve is prevented by suitable side seal rings 105 on the valve body sections engaging the valve sleeve on opposite sides of its enlarged bore 97. Assuming the valve sleeve 93 to be shifted relatively upwardly along the body 80, 81 against the force of its spring 94 as determined by engagement of the sleeve heal 95 with a downwardly facing adapter shoulder 106 (FIG. 7c), the lower seal surface 108 of the valve sleeve will be disposed across the side port 98 and in sealing engagement with the lower ring 105 and an intermediate seal ring 109 clamped between the valve body sections 80, 81, closing the port 98 and preventing any fluid in the injection passage 70 from passing downwardly to the check valve 99 and into the tubular extension 82.

Each packer module 77 includes the body 78, referred to above, around which a rubber or rubber-like packing element 10 is disposed, which is held between an upwardly facing shoulder 110 on each body and the lower end 111 of the body thereabove. Suitable upper and lower gauge rings 112 are threadedly secured to the bodies 78 on opposite sides of each packing element to minimize extrusion or cold flow of the packing element from its sealed position against the well casing C when expanded outwardly against the latter. The packing elements 10 are adapted to be inflated or expanded outwardly against the well casing by fluid under pressure in the injection passage 70 passing to the interior of each packing element through a radial port 113 in each body extending from the injection passage. Fluid in the injection passage 70 can also flow outwardly through a constant flow regulator 114, described in detail hereinbelow, the fluid discharging from the latter and then passing outwardly through one or more openings or perforations D in the well casing straddled by adjacent inflated packing elements 10.

A latch sleeve 15 is suitably secured to the lower portion of the lower valve sleeve 93, which has expandable and contractible latch legs or arms 116 on which an external thread 117 is formed to mesh with a companion internal thread 118 usually found in a known type of packer E that can be used as the locator anchored against the well casing. If the internal thread 118 in the packer are of left hand, the thread 117 of the latch sleeve will also be of left hand. However, such threads preferably have their upper and lower sides beveled or tapered so that the arms 116 can simply be snapped into and out of the threaded box 118, the arm threads ratcheting longitudinaly along the box threads of the lower locator or packer E, no rotation being required to latch the sleeve 115 within the packer E or to release it therefrom.

A constant flow regulator 114 is disposed between each pair of packing elements 10. The specific regulator illustrated in the drawings, and more particularly in FIG. 6, is designed to control the flow of fluids at two different rates into the well casing between the packing elements. As shown, each module body 78 has a lateral bore 120 extending from its injection passage 70 to its exterior and in which a valve body 121 is threadedly secured. A large valve piston 122 is slidable in a cylinder bore 123 in this body and also along a central guide rod 124 that passes through the hub 125 of an end plate 126 clamped to the valve body 121 by a clamp nut 127, the rod having an inner head 128 bearing against the hub. The piston has a longitudinal passage 129 that communicates with an orifice 130 in an orifice plate 131 bearing against the inner end of the piston 122, there being a suitable piston ring 132 between the large piston and the plate slidable along the cylindrical wall 123 of the body.

Fluid from the injection passage 70 can pass through the openings 133 in the end plate 126 and through the choke orifice 130 into the central passage 129, discharging from this passage and through a central valve seat 134 suitably secured to the valve body 121, the large piston having a central head 135 adapted to be spaced variously from the valve seat 134 to throttle the flow of fluids between the head and seat and maintain such flow at a constant rate in passing through the valve seat. The fluid pressure in the inlet passage 70 and on the high pressure side of the orifice plate 131 tends to urge the piston 122 in an outward direction, and tends to bring the head 135 closer to its seat 134 to throttle the flow. Such movement is resisted by a helical compression spring 136 bearing against the piston 122 and also against the valve body 121 and tending to shift the head 135 away from the seat 134. Thus, if the pressure differential tends to increase, the piston 122 is moved to the left, as seen in FIG. 6, to bring the head 135 closer to the seat 134 and thereby throttle the flow. Any tendency for the pressure differential to decrease causes the spring 136 to shift the large piston 122 to the right and tends to open the effective passage area between the head 135 and seat 134. As a result, the rate of flow of fluid through the seat 134 is maintained at a substantially constant value.

The fluid passing into the valve seat 134 must unseat a check valve 140 before it can flow outwardly through body ports 141 to the exterior of the valve body 121 and into the well casing C between the packing elements 10. As disclosed, a check valve body 142 is threadedly secured centrally in the main valve body 121 and has a valve head 143 urged into engagement with the valve seat 134 under the influence of a helical compression spring 144 bearing against the head and against the check valve body. When fluid under sufficient pressure passes into the valve seat 134, it will shift the check valve head 143 from the seat 134 and allow the fluid to flow through the passages 141 to the exterior of the body 121 and into the well casing C.

The constant flow regulator 114 has another passage for fluid under the control of a switching valve mechanism, which is arranged to permit fluids of relatively low viscosity to pass readily therethrough, but which will close when fluids of relatively high viscosity are being pumped through the injection passage 70. As shown, fluids flowing through the head or end plate 126 can also flow into another bore 146 through the large piston, in which a small valve piston member 147 is slidable. This small piston has a central bore 148 communicating with lateral ports 149 opening into an internal circumferential groove 150 in the large piston 122. From this groove, a passage 151 extends to the other passage 129 of the large piston. The small piston 147 is normally urged to a position in which its ports 149 are in full communication with the groove 150 by a helical compression spring 152 bearing thereagainst and against the large piston. When such ports 149 are in communication with the groove 150, fluid can flow readily through the bore 148 and ports 149 into the groove 150 for continued flow through the transverse passage 151 in the piston and into the other passage 129, such fluid combining with the fluid flowing directly through the orifice 130 into the passage, and then passing outwardly through the valve seat 134 past the check valve 140 into the well casing C.

When a fluid or liquid having a relatively low viscosity is passing through the flow regulator 114, it will flow into the bore 148 of the small piston 147 and through its ports 149, leaking along the periphery of the piston to its downstream side where the spring 152 is contained, and flowing to a small extent out through a port 154 in the piston 122 at its outer end. The fluid of low viscosity can flow relatively freely along the exterior of the piston 147 so that the pressure differential across the head or partition of the small piston is insufficient to overcome the force of the spring 152, which thereby results in the spring maintaining the small piston fully to the right, as seen in FIG. 6, allowing a full flow of the liquid into the small piston and through its interconnecting passage 151 to the main passage 129 through the large piston. However, in the event a comparatively viscous fluid passes into the small piston 147, its viscosity will preclude its significant flow down around the periphery of the small piston to its spring side, producing a pressure differential on the small piston 147 shifting it to the left, as seen in FIG. 6, which will shift the imperforate portion 155 of the piston across the groove 150 and close the same. As a result, the viscous fluid can only flow through the orifice 130 and into the passage 129, resulting in a very large reduction in the rate of fluid flowing into the passage 129 and between the valve head 135 and seat 134, past the check valve 140 and through the ports 141 to the exterior of the valve body 121.

By way of example, when fluid is being pumped through the injection passage 70, which is of a low viscosity, such as diesel oil, it will flow in parallel through the orifice 130 and also through the transverse passage 151, the rate of flow being govereneed by the pressure differential across the orifice 130, shifting the head 135 with respect to the valve seat 134 and insuring a constant rate of flow into the valve seat past the check valve 140. On the other hand, with a viscous fluid being pumped into the injection passage, such as an epoxy resin, the switching valve 147 is shifted to the left in FIG. 6 to a closed position, so that such fluid can pass only through the orifice 130 into the passage 129, the rate of flow of fluid through the passage 129 and between the valve head 135 and valve seat 134 being only about one-sixth the rate of flow of the diesel oil. This is a desirable feature, since in the performance of a sand consolidation operation in the well bore it is desired to displace the diesel oil and other light fluids at a much higher rate and in greater volume than the resin which is to saturate the interstices between the sand grains and coat the latter.

In the use of the apparatus illustrated in FIGS. 1a to 9, inclusive, the locator or packer E has previously been set in the well bore below the region at which the casing is to be perforated at spaced intervals along its length. As described hereinabove, a suitable perforating gun (not shown) is then lowered in the well casing C, coming to rest upon the lower locator E and the gun fired in salvo to shoot the openings or perforations D in the well casing, which are spaced longitudinally with respect to one another by a predetermined and known distance. The perforating gun is then removed from the well casing and the apparatus F illustrated in the drawings then lowered thereinto. The upper unloader valve 11 is initially in its open condition and the upper valve sleeve 15 is in its upper position, as illustrated in FIG. 4a, in which the circulation passage 44, 43, 42, 37, 40, 41, 47, 59, 58, 57, 60, 61, 90, 92 through the tool is open and in communication with the screen assembly 12, unloader valve 11, and tubing string H thereabove. The lower valve sleeve 93 is in its lower position, but the check valve 99 will prevent upward flow of fluid into the injection passage 98, 97, 88, 87, 70, 63, 62, 33, 32, although the upper end of the injection passage communicates with the fluid in the well casing through the port 35 extending through the valve sleeve 15. During lowering of the apparatus through the fluid in the well casing, fluid can flow through the circulation passage 61, 57, 47 and into the enlarged bore 37, continuing through the radial ports 42 into the central passage 43, from which it will flow upwardly through the screen assembly 12 and unloader valve 11 into the tubing string H. The fluid in the well bore can move past the sleeve port 35 and into the injection passage 32, 33, 62, 70 through the upper end of the latter. However, the check valve 99 prevents upward flow of fluid into the injection passage 70 to prevent any pressure from being built up in the injection passage that would tend to inadvertently expand the packing elements 10 outwardly against the wall of the well casing C. In fact, the flow of fluid past the sleeve port 35 tends to maintain a lesser fluid pressure in the injection passage 70 than exists externally of the packing elements 10, so that the latter are urged and held in their inward retracted position.

The apparatus is lowered until the lower valve sleeve 93 latches into the bottom locator E, at which time the packing elements 10 straddle the perforations D. If desired, prior to latching of the sleeve 115 in the lower locator E, circulating fluid can be pumped down through the tubular string H, passing through the screen assembly 12, filter screen 68, the packer apparatus and its tubular extension 82 into the well bore, flowing upwardly around the exterior of the apparatus F and back to the top of the well bore. Thereafter, the latch 115 is latched into the body of the packer E and the tubular string H lowered in the well casing, which will lower the entire apparatus, with the exception of the lower sleeve valve 93, and close the lower end of the injection passage 70 by virtue of the fact that the lower sleeve valve then straddles the radial port 98 leading to the check valve 99. The tubular string H is now rotated to feed the upper valve head 14 and upper valve sleeve 15 downwardly along the valve body 16, because of the threading action of the clutch segments 21 on the threaded stem 19, until the valve sleeve 15 is in its lower position, as illustrated in FIG. 7a, in which the circulation passage 61, 56, 47, 41 is closed with respect to communication with the tubing string H, but the enlarged upper valve sleeve bore 37 is placed in communication with the injection passage 32, 33, 62, 70 so that fluid can then be pumped downwardly through the tubular string H, unloader valve 11 and screen assembly 12 into the valve body 16, passing through the radial ports 42 into the enlarged bore 37 and then through the radial port 32 into the injection passage 33, 62, 70. It is apparent that, at this time, the upper sleeve valve 15 is in its downward position and the lower valve sleeve 93 is in its relative upward position to open the upper end of the injection passage to the flow of fluid, but to close the lower end of the injection passage to prevent downward flow of fluid therefrom.

Assuming that sufficient set-dwn weight has been provided to close the upper unloader valve 11, suitable fluid or liquid is then pumped down through the tubular string H, passing through the upper unloader valve and screen assembly 12 into the head passage 44, continuing downwardly through the valve passage 43 and through the radial ports 42 into the enlarged bore 37 and into the injection passage 32, 33, 70. The only outlet from the injection passage is through the constant flow regulators 114, but since these regulators will only open when a sufficient pressure has been developed in the injection passage 70 to unseat the check valves 140, the first application of pressure to the fluid in the injection passage 70 will result in the inflation of the packing elements 10 into sealing engagement with the wall of the well casing C on opposite sides of the casing perforations D, as illustrated in FIGS. 1a and 1b and also in FIGS. 7a, 7b and 7c. An increase in the fluid pressure to overcome the check valves 140 will result in opening of the latter and the ejecting of the liquid through the constant flow regulators 114 into the well casing, such liquid then being forced through the casing perforations D into the surrounding formation. As described above, the regulator valves 114 will insure the passage of a constant flow of liquid between each valve head 135 and the valve seat 134 and outwardly into the casing between the packing elements 10 sealed against the well casing. If all of the regulator valves 114 in the tool are set to deliver fluid at the same constant rate, the result will be an ejection of fluid at the same volumetric rate through each set of perforations D into the surrounding formation.

When a less viscous fluid, such as diesel oil, is being pumped through the apparatus, the switching valve 147 is in its full open condition so that a larger volume of fluid is being pumped through each regulator valve 114; whereas, the injection of a relatively viscous fluid, such as an epoxy resin, will result in the switching valve being shifted to its closed position so that fluid at a much lower rate is being discharged from each flow regulator. During the pumping of fluid through the apparatus, the packing elements 10 remain sealed off against the well casing C, in view of the necessity of a pressure differential always remaining within the injection passage 70 to overcome the force of each spring 144 urging the check valve head 143 toward closed position against its companion valve seat 134.

After the treating operation in the well bore has been completed, the tubing string H is elevated, which will shift the upper valve sleeve 15 upwardly along the valve body back to the position illustrated in FIG. 4a, the clutch segments 21 ratcheting freely upwardly along the companion ratchet thread teeth 23 on the valve stem 19. Such valve location will establish communication between the upper end 32 of the injection passage and the exterior of the valve sleeve through the port 35, relieving the fluid pressure within the passage 70 and allowing the packing elements 10 to retract inherently from the well casing back to the position illustrated in FIGS. 4a, 4b and 4c. An upward strain can now be taken on the tubing string and the apparatus connected thereto, which will pull the lower valve sleeve 93 relatively back to its downward position and then result in pulling of the latch arms 116 out of the threaded box 118, since the arms can spring inwardly assisted by the camming of their upper tapered tooth surfaces against the companion threads of the packer box. The tool is thus released from the locating packer E and can be elevated in the well bore. The upward motion will first shift the unloader valve 11 to its open position establishing communication between its interior and exterior. During elevation of the apparatus through the fluid in the well bore, the latter can pass through the port 35 into the injection passage 70. However, pressure of an extent sufficient to expand the packing elements 10 outwardly cannot be built up in such passage, as a result of elevation of the apparatus through the fluid in the well bore, since the liquid in the passage can dump or exhaust downwardly past the downwardly opening check valve 99. The only pressure differential that can be built up in the injection passage 70 is that required to overcome the force of the spring 101 tending to hold the ball check valve 102 in its upper valve closing position, but such spring can be made relatively light so that the check valve opens in a downward direction at a relatively low pressure.

The multiple injection packer can be made of any length and capable of straddling any numbers of sets of perforations D in the well casing. Only a few modules 77 have been illustrated in the drawings for purpose of illustration, but they can be of any number, and the distance between the packing elements 10 can be made of any practical extent. As an example, the distance between packing elements may be one feet or two feet, to be assured that the fluid ejected from the apparatus between the expanded packing elements 10 covers relatively short intervals and insures a uniform injection of fluids along the entire length of the formation A to be treated. The flow regulators 114 will result in the same volumetric rate of fluid being dicharged into the formation at each perforated region thereof, regardless of the fact that the resistance to acceptance of the fluid at different regions might vary.

Although specific reference has been made to the injecting of different specific fluids in the performance of a sand consolidation operation, it is to be understood that the apparatus disclosed can be used to secure the uniform injection of other fluids into the formation. Thus, the apparatus can be used in the performance of a water flooding, steam injection, or acidizing operation to insure the uniform distribution of the particular fluid being injected along the length of the formation A. If apparatus were used that straddled a comparatively long length of formation, with packing members that were spaced, for example, 40 feet apart, the fluid being pumped into the well bore between the packing members would tend to pass at greater rates into regions of the straddled length of the formation that are weaker than other regions of the straddled formation.

The apparatus M illustrated in FIGS. 10a to 14 will not only serve to insure the injection of fluids into the formation uniformly along its length, but can also effect a perforation of the well casing between the packing elements 10, providing assurance that the packing elements will be disposed above and below, or on opposite sides of each perforation or sets of perforations D. The specific apparatus illustrated in the drawings does not require a bottom locator E to determine the position of the tool in the well casing at which it is to be set. Although it could be used with such a bottom locator, it embodies its own apparatus for anchoring and locating it in the well casing.

As disclosed in the drawings, the apparatus includes a lower anchor body 200 to which a lower valve body 201 is threadedly secured, there being a suitable side seal 202 mounted on the body 201 and clamped between it and the body 200. The anchor body 200 has a central passage 203 therethrough that contains a check valve device 204 clamped therewithin by the lower valve body 201. This check valve includes a body 205 sealed against the anchor body by a suitable seal ring 206. It has a central passage 207 surrounded by a valve seat 208 adapted to be engaged by a ball valve element 209 therebelow urged thereagainst by a spring 210. The check valve 204 will allow fluid to pass downwardly from the passage 203 around the ball valve 209 and spring 210, discharging through a central opening 211 in the check valve body into a central passage 212 in the valve body that communicates with a plurality of radial ports 213 opening outwardly therethrough, the ports being controlled by a lower sleeve portion 214 of a control member 215 surrounding the anchor and valve bodies 200, 201. In the position illustrated in FIG 10c, fluid can pass downwardly through the check valve 204 into the valve body and out through its ports 213, discharging through lateral ports 216 extending through the control member. When the anchor body 200 and valve body 201 are shifted downwardly relative to the control member, the ports 213 are disposed fully within the valve sleeve portion 214, the upper seal 202 and a lower seal 217 below the ports sealing against the inner surface of the valve sleeve to close the ports 213, at which time the fluid cannot be pumped downwardly through the anchor body passage 203.

The control member 215 carries a plurality of circumferentially spaced friction drag blocks 218 in radial sockets 219 which are urged outwardly by helical compression springs 220 to frictionally engage the blocks with the wall of the well casing C. The outward limit of movement of the blocks 218 is determined by their engagement with suitable stop screws 221 threaded into the member 215 on opposite sides of the blocks. Disposed within the control member are a plurality of lock segments 222, which may be of the same general type as illustrated in FIG. 4a, except that the internal ratchet teeth threads 223 face in an upward direction, the segments being prevented from turning with respect to their companion member 215 by a screw 224 threaded in one or each segment 222 and extending into a radial opening 225 in the member 215. The segments 222 are urged inwardly, to bring their threads 223 into mesh with an external downwardly facing ratchet thread 226 on the anchor body 200 by a plurality of contractable bellyband coil springs 227, which, however, permit the segments to expand outwardly in the event the anchor body 200 moves upwardly of the segments.

The upper end of the control member 215 is threadedly secured to a stop ring 228, which, in turn, is threadedly or otherwise suitably secured to a slip sleeve 229 having a plurality of circumferentially spaced longitudinal grooves 230, in each of which is contained a slip 231 having a lower drag portion 232 and an upper anchor portion 233. The lower drag portion 232 is urged outwardly into frictional engagement with the wall of the well casing C by helical compression springs 234 bearing against the slip sleeve 229 and against the drag portion. When the drag portions are fully engaged with the well casing, the upper anchor portions 233 are retracted inwardly from the wall of the well casing, their downwardly facing teeth or wickers 235 being disposed away from the casing wall. The extent of outward expansion of the drag portions 232 under the influence of the springs 234 is limited by engagement of lower terminals 236 of the slips with an upwardly extending stop rim 237 projecting axially from the stop ring 228.

The slips 231 are movable jointly with the slip sleeve 229 in the well casing by virtue of the fact that they are engaged by the ring 228 and that an upper sleeve flange 238 overlies a ring 239 encompassing the slips and disposed in a groove 240 in the latter between their drag and anchor portions 232, 233. This ring 239 permits the slips to rock on their drag portions 232 to bring the anchor portions 233 inwardly and outwardly with respect to the wall of the well casing.

Initially, the slips 231 are spaced longitudinally downwardly from a companion expander 241 having a downwardly tapering expander surface 242 adapted to coact with companion inner surfaces 243 on the anchor portions 233 of the slip members. This expander 241 is threadedly secured to the upper end of the anchor body 200 and is integral with a body section 245 of a packer module 246. The upper end of this module body is, in turn, threadedly secured to the lower end of another packer module body 247 thereabove, packer module bodies 247 being successively threadedly secured to one another, depending upon the number of packer modules 246 which are desired in the performance of the operation in the well bore. The uppermost packer module 247 is threadedly attached to a valve body 248, which is, in turn, threadedly secured to a tubular extension 249 attached to another section of tubing 250, which may constitute part of an unloader valve of any suitable type for the purpose of establishing communication between the interior and exterior of the tubular string above the packer apparatus. Such unloader valve 11 may be of the same type as illustrated in FIG. 1a, and is shifted to a position opening its side ports (not shown) when shifted in a downward direction, and which will be in a closed position when moved upwardly by the tubular string H. Since the unloader valve forms no part of the present invention, it has not been illustrated in the interest of simplicity.

The anchor body passage 203 communicates with an injection passage 251 extending through all of the packer module bodies 245, 247, which are in communication with each other, as, for example, by having the upper end of each longitudinal body passage 251 open into a circumferential recess 252 provided between the adjacent ends of the bodies 247. The uppermost module body passage 251 communicates with a passage 253, 254 in the upper valve body, which, in turn, opens into the tubular extension 249 that communicates with the unloader valve 11 and tubular string H thereabove. The valve body passage 253, 254 includes two portions separated from one another. Thus, a lower portion 253 of the passage opens outwardly of the valve body 248 through a port 255 and the lower end of the upper passage portion 254 opens outwardly of the valve body 248 through a port 256. These two ports can be placed in communication with one another, or such communication prevented, by a sleeve valve 257 slidably mounted on the valve body 248 and shiftable between an upper position on the valve body in engagement with the lower end 258 of the tubular extension 249, as illustrated in FIG. 10a, in which the ports 255, 256 and their passages 253, 254 communicate with one another, and a lower position in which the upper portion of the sleeve valve 257 is disposed across the ports 255, 256 and restricts the flow of fluid therebetween, the fluid only being able to flow at a low rate due to leakage. When the sleeve valve 257 is in its upper position, free communication between the ports 255, 256 is established by virtue of the enlarged bore 259 of the sleeve valve straddling the ports. Leakage of fluid in both directions between the valve body 248 and the sleeve 257 is prevented by the upper and lower side seals 260 on the valve sleeve slidably and sealingly engaging the periphery of the valve body.

During lowering of the apparatus in the well casing, the valve sleeve 257 occupies the relative upward position illustrated in FIG. 10a because of the friction drag afforded by friction drag blocks 261 mounted in circumferentially spaced sockets 262 in the valve sleeve 257 and urged outwardly into frictional engagement with the wall of the well casing by helical compression springs 263. The limit of expansion of the blocks is determined by their engagement with stop screws 264 secured to the valve sleeve above and below each drag block.

Each module body 245, 247 has an expandable normally retracted packing element 10 of pliant, elastic material, such as rubber, mounted thereon confined between the lower end of one body 247 and the body member 247 therebelow. Upper and lower gauge rings 112 are threadedly secured to the bodies on opposite sides of the packing element 10 to confine the packing elements on the bodies and to limit the extent of their extrusion or cold flow around the gauge rings when the packing elements are expanded outwardly against the wall of the well casing. The packing elements 10 are inflated or expanded against the casing wall by fluid under pressure in the injection passage 251, such fluid passing outwardly through ports 113 in the body extending to the interior of each packing element.

A flow regulator 114a is provided in each module body 247 between packing elements 10 to insure a uniform flow of fluid between the packing elements and along the length of the apparatus into the well bore. As disclosed most clearly in FIG. 12, fluid from the passage 251 of each module body can pass into a transverse bore 270 in the body, in which a housing 271 is suitably secured that carries a filter screen 272, the fluid passing through the filter screen and from the housing through a port 273 communicating with a second transverse bore 274 in the body. This transverse bore is closed by a plug 275 at one end and has a flow regulator valve body 276 mounted therein and suitably sealed thereagainst by a side seal ring 277, this valve body having a sleeve valve 278 therein provided with an orifice 279 in its head end of a predetermined size. The sleeve valve is shiftable across body side ports 280 opening to the exterior of the body 276 against the force of a spring 280a, from which fluid can flow into a check valve device 281, including a body 282 threadedly secured in a third transverse bore 283 of the body, the body passage 284 being surrounded by a valve seat 285 adapted to be engaged by a check valve ball 286, or the like, urged against the seat by a helical compression spring 287. When the fluid is under sufficient pressure to unseat the ball 286, it will pass into the check valve housing and through its outlet 288 to the exterior of the body 247 between packing elements 10. The check valve device 281 insures the existence of a pressure differential in the injection passage 251 to retain the inflatable packing elements 10 sealed against the wall of the well casing. The check valve will not open until a substantial pressure is within the check valve housing 282 to insure the firm and leakproof sealing of each packing element 10 against the wall of the casing C.

The apparatus also embodies a casing perforating mechanism for shooting one or a plurality of perforations or openings D through the well casing between each pair of packing elements 10. As disclosed most clearly in FIG. 11, a pair of oppositely directed bullets 290 are contained in gun barrels 291 threadedly secured in the body 247 of each module, the bullets being interconnected by a weakened section 292 disposed within a chamber 293 containing an explosive 294, such as black powder. Communicating with the chamber is an electric igniter 295 threadedly or otherwise suitably secured in leakproof relation in the module body. The electric igniters of the several modules are interconnected by a conductor wire 296, each conductor wire extending from an igniter and through a longitudinal central passage 297 in the module body to a terminal device 298 disposed in leakproof relation in the upper end of a module body, which extends into the lower end of a central passage 299 in an upper adjacent body. This connector is connected by means of a conductor 300 to another igniter 295 forming part of the perforating combination of the next module body, which is connected by means of a conductor 301 passing through the central passage 297 of such body into a central passage 302 through the valve body 248, where it is secured to a terminal or probe 303 insulated from the bodies 248, 249 by an insulated bushing 304.

The adjacent packer bodies 247 are sealed with respect to one another by a gasket 305 surrounding their central passages 297, so as to prevent transverse leakage of fluid between the bodies. In addition, the connectors 298 resist high pressures and prevent fluid communication between the conductor passage 297 of one body and the conductor passage of another body, so that when the bullets 290 are fired from the gun barrels 291, intercommunication between the exteriors of the bodies 247 through the conductor passages cannot occur. The zones straddled by each pair of packers 10 are maintained out of communication with an adjacent formation zone.

The guns are fired simultaneously, or in salvo, by lowering an energy source on a wire line W down through the tubing string H. As illustrated in FIG. 14, this energy source consists of batteries 320 connected in series and contained within a suitable housing 321, the upper end of the housing being threadedly attached to an adapter 322 to which the lower end of the wire line W is secured. The lower contact 323 of the lowermost battery 320 engages a terminal 324 disposed within an insulated end member or closure 325 threaded into the housing 321. The lower end of this terminal is formed as a socket 326 adapted to receive the upper terminal probe 303. A helical compression spring 327 is disposed in the housing 321, bearing against its upper end and against the uppermost battery 320 to maintain them in contact with one another and with the terminal 324.

When the guns are to be fired, the energy source is lowered by means of the wire line W through the tubing string until the terminal socket 326 is disposed over the probe 303 and in contact therewith. The battery housing 321 leans against the tubular member 249 and simultaneously completes the circuit through all of the igniters 295, which will fire and detonate the black powder charges 294, the explosive force parting the bullets 290 at their weakened sections 292 and propelling them outwardly through their gun barrels 291 and through the well casing C to perforate the latter. The wire line W and energy package can then be elevated through the tubing string and removed from the well bore.

The apparatus illustrated in FIGS. 10a to 14 is lowered in the well casing, with the parts in the condition illustrated in FIGS. 10a, 10b and 10c. The lock segments 222 retain the anchor body 200 secured to the control member 215 and hold the slips 231 in a lower position relative to the expander 241, in which the anchor portions 233 are retracted and the drag portions 232 frictionally engaged with the wall of the well casing. The apparatus is lowered in the well casing to the desired setting point, the friction drag of the upper drag blocks 261 holding the valve sleeve 257 in its upper position in which the ports 255, 256 are in communication with one another. The lower valve sleeve 214 is in its port opening position. However, fluid cannot flow upwardly through the ports 213 and into the passage 203 through the body, which might tend to build up an internal pressure in the injection passage 251 to expand the packing elements 10, because of the upwardly closing action of the lower check valve 204. The upper unloader valve 11, which is preferably used, allows the fluid to flow into the tubular string H and downwardly into the injection passages 251, since the valve sleeve 257 is in the position allowing communication between the ports 256, 255 to fill the tool and maintain it filled with well bore fluid. Thus, a pressure differential is not built up in the injection passages 251, the packing elements 10 remaining fully in their retracted condition.

When the location in the well casing is reached at which the treating operation is to take place, the tubing string H is rotated to the right, which will thread the anchor body 200 downwardly within the lock segments 222 and release it from the latter. The turning of the lock segments 222 is prevented by the frictional engagement of the drag blocks 218 against the wall of the well casing. Following release of the anchor body 200, the tubing string is lowered to shift the entire mechanism downwardly, with the exception of the slip device 231, 229, etc. and the lower valve device 214, 215, which will shift the expander 241 downwardly within the slips and rock their anchor portions 233 outwardly and embed their wickers 235 in the wall of the well casing C. At the same time, the valve body ports 213 are disposed in the lower sleeve portion 214 of the control member 215 in which the seal ring 202 is disposed above the ports 216 through the member 215, closing the injection passage 251 against downward flow of fluid. The apparatus is now anchored to the well casing against downward movement.

The power package or energy source 320–326 is now lowered through the tubular string to bring the terminal socket 326 into engagement with the upper terminal 303 connected to the several igniters 295, completing the circuit through the latter, which contain a suitable powder that will explode and ignite the black powder 294 to fire the bullets 290 and perforate the casing between the sets of packing elements 10. The power package 320–326 is now elevated in the tubing string and removed from the well bore. For convenience of illustration, the perforations D are disclosed in FIGS. 13b, 13c displaced 90 degrees from their actual location.

An appropriate fluid can now be pumped down through the tubing string H with the unloader valve 11 (if one is used) closed, because of the set-down weight imposed upon the tubing string, such fluid under pressure passing into the tubular extension 249 and flowing through the upper passage portion 254 and out through the port 256 into the enlarged bore 259 of the sleeve valve 257, then passing into the other port 255 for continued downward movement through all of the injection passages 251. As noted above, the lower sleeve valve 214 is in its closed condition, so that the fluid under pressure can pass outwardly only through the regulator valve devices 114a between each pair of packing elements 10. Because of the check valves 281, a sufficient pressure must first be built up to expand the packing elements 10 into firm sealing engagement with the wall of the well casing C, after which the fluid will unseat the ball check valve element 286 and flow outwardly through the check valve device into the well casing and then through the perforations D into the surrounding formation.

The flow regulator valve 278 has an orifice portion 279 and a throttle portion 350. It will maintain a predetermined pressure drop through the orifice 279, which will govern the rate at which liquid is flowing therethrough. If the pressure differential across the orifice 279 tends to increase, which would be accompanied by an increased rate of flow, the valve sleeve 278 is shifted against the force of its spring 280a partially across the ports 280 to throttle or restrict the flow through such ports and result in an increase in the back pressure on the downstream side of the orifice 279. On the other hand, if the upstream pressure on the orifice tends to decrease or the pressure downstream thereof tends to increase, the spring 280a will shift the sleeve valve 278 in the opposite direction to uncover the ports 280 to a further extent, thereby throttling the flow to a lesser extent. Accordingly, a predetermined pressure drop is maintained across the orifice 279 so that fluid at a constant flow rate passes outwardly through the ports 280, regardless of variations of the injection passage pressure or variations in each outlet pressure. Accordingly, fluid flowing at a constant rate passes through each regulator apparatus 114a into the well casing C between each pair of expanded packing elements 10 and outwardly through the perforations D into the surrounding formation, thus insuring that fluid at a uniform rate is being discharged into the formation along the entire length subtended by the uppermost and lowermost packing elements.

In the event it is desired to retrieve the apparatus, the fluid pressure in the tubing string H and in the injection passages 251 is bled off or relieved, which allows the packing elements 10 to retract adherently from the well casing C. An upward pull is then taken on the tubing string H and the several bodies 248, 247, 245, 200, 201, shifting the body 248 upwardly and resulting in the upper sleeve valve 257 shifting downwardly along it so that its upper cylindrical surface substantially closes the ports 255, 256 against intercommunication. At the same time, the expander 241 is elevated with respect to the slips 231, allowing the springs 234 to rock the drag portions 232 into full engagement with the well casing and pivot the anchor portions 233 inwardly from engagement with the well casing. At the same time, the threaded external ratchet portion 226 of the anchor body is ratcheting freely through the lock segments 222 back to their initial locked position, and the valve body 201 is moved upwardly with respect to the control member 215 to again place the body ports 213 in communication with the member ports 216, as illustrated in FIG. 10c. Such upward movement of the anchor body 200 and valve body 201 results from the resistance to upward movement afforded by the lower friction drag blocks 218 against the wall of the well casing.

The apparatus is now elevated in the well casing. During such elevation, the upper unloader 11, if one is used, will be placed in its open position to permit well bore fluid to flow downwardly through the apparatus and downwardly through the injection passage 251, fluid leaking along and into the valve sleeve 257 between the ports 256, 255 and discharging through the check valve 204, the valve body passage 212 and its ports 213, and through the member ports 216 into the well bore therebelow. Thus, an internal pressure differential is prevented from building up in the injection passage 251 during elevation of the apparatus in the well bore, which might tend to inadvertently expand the packing elements 10 into engagement with the wall of the well casing and result in their damage or destruction. Elevation continues until the apparatus is withdrawn completely from the well bore.

I claim:

1. In subsurface apparatus for injecting fluid through perforations in a conduit string disposed in a well bore: rigid body means having a fluid passage and adapted to be disposed in the conduit string; a plurality of individual normally retracted packing means on said rigid body means longitudinally spaced from each other for sealing against the conduit string to form a plurality of separated zones in the conduit string between spaced individual packing means isolated from one another and straddling the perforations in the conduit string; means for expanding said plurality of packing means against the conduit string; means providing a separate flow path from said fluid passage to each of said separated zones externally of said body means; and flow regulator means in each of said paths removed from said passage for controlling the rate of flow of fluid therethrough to each of said zones.

2. In subsurface apparatus for injecting fluid through perforations in a conduit string disposed in a well bore: rigid body means having a fluid passage and adapted to be disposed in the conduit string; a plurality of individual normally retracted packing means on said body means longitudinally spaced from each other for sealing against the conduit string to form a plurality of separated zones in the conduit string between spaced individual packing means isolated from one another and straddling the perforations in the conduit string; means for expanding said plurality of packing means against the conduit string; means providing a separate flow path from said fluid passage to each of said separated zones externally of said body means; and flow regulator means in each of said paths removed from said passage for maintaining the volumetric rate of fluid flow through all of said paths substantially equal to one another.

3. In subsurface apparatus for injecting fluid through perforations in a conduit string disposed in a well bore: body means having a fluid passage and adapted to be disposed in the conduit string; a plurality of packing means on said body means for sealing against the conduit string to form a plurality of separated zones in the conduit string isolated from one another and straddling the perforations in the conduit string; means providing a separate flow path from said fluid passage to each of said separated zones externally of said body means; flow regulator means in each of said paths for maintaining the volumetric rate of fluid flow through all of said paths substantially equal to one another; each of said flow regulator means comprising throttle valve means and orifice means connected to said throttle valve means for controlling the effective flow area of said throttle valve means in response to fluid pressure drop through said orifice means.

4. In subsurface apparatus for injecting fluid through perforations in a conduit string disposed in a well bore: body means having a fluid passage and adapted to be disposed in the conduit string; a plurality of packing means on said body means for sealing against the conduit string to form a plurality of separated zones in the conduit string isolated from one another and straddling the perforations in the conduit string; means providing a separate flow path from said fluid passage to each of said separated zones externally of said body means; and flow regulator means in each of said paths for controlling the rate of flow of fluid therethrough to each of said zones; each of said flow regulator means embodying parallel flow passageways through which fluids of relatively low viscosity can flow simultaneously, and means for substantially closing one of said passageways in response to flow of fluid in said path having a relatively high viscosity to reduce the volumetric rate of flow of such high viscosity fluid through said path.

5. In subsurface apparatus for injecting fluid through perforations in a conduit string disposed in a well bore: body means having a fluid passage and adapted to be disposed in the conduit string; a plurality of packing means on said body means for sealing against the conduit string to form a plurality of separated zones in the conduit string isolated from one another and straddling the perforations in the conduit string; means providing a separate flow path from said fluid passage to each of said separated zones externally of said body means; and flow regulator means in each of said paths for controlling the rate of flow of fluid therethrough to each of said zones; each of said flow regulator means embodying means for restricting the area through its flow path when relatively high viscosity fluids are flowing through said flow path to a smaller value than when relatively low viscosity fluids are flowing through said flow path, whereby relatively high viscosity fluids flow through its flow path at a substantially lower volumetric rate than the volumetric rate at which relatively low viscosity fluids move through its flow path.

6. In subsurface apparatus for injecting fluid through perforations in a conduit string disposed in a well bore: rigid body means having a fluid passage and adapted to be disposed in the conduit string; a plurality of individual normally retracted packing means on said rigid body means adjacent to and longitudinally spaced from one another for sealing against the conduit string to form a plurality of separated zones in the conduit string between spaced individual packing means isolated from one another and straddling the perforations in the conduit string; means for expanding said plurality of packing means against the conduit string; means providing a separate flow path from said fluid passage to each of said separated zones externally of said body means; and flow regulator means in each of said paths removed from said passage for controlling the rate of flow of fluid therethrough to each of said zones.

7. In subsurface apparatus for injecting fluid through perforations in a conduit string disposed in a well bore: body means having a fluid passage and adapted to be disposed in the conduit string; a plurality of initially retracted packing means on said body means and responsive to fluid pressure in said passage to be expanded outwardly into sealing engagement with the conduit string to form a plurality of separated zones in the conduit string isolated from one another and straddling the perforations in the conduit string; means providing a separate flow path from said fluid passage to each of said separated zones externally of said body means; flow regulator means in each of said paths for controlling the rate of flow of fluid therethrough to each of said zones; each of said flow regulator means including normally closed valve means adapted to open when subjected to a predetermined pressure in said passage which is in excess of the pressure required to expand said packing means into sealing engagement with the conduit string.

8. In subsurface apparatus for injecting fluid through perforations in a conduit string disposed in a well bore: body means having a fluid passage and adapted to be disposed in the conduit string; a plurality of initially retracted packing means on said body means and responsive to fluid pressure in said passage to be expanded outwardly into sealing engagement with the conduit string to form a plurality of separated zones in the conduit string isolated from one another and straddling the perforations in the conduit string; means providing a separate flow path from said fluid passage to each of said separated zones externally of said body means; flow regulator means in each of said paths for controlling the rate of flow of fluid therethrough to each of said zones; each of said flow regulator means including throttle valve means and orifice means connected to said throttle valve means for controlling the effective flow area of said throttle valve means in response to fluid pressure drop through said orifice means, and back pressure valve means on the discharge side of said throttle valve means and orifice means for maintaining a greater pressure in said passage than in said zones to retain said packing means in sealing engagement with the conduit string.

9. In subsurface apparatus for injecting fluid through perforations in a conduit string disposed in a well bore: body means having a fluid passage and adapted to be disposed in the conduit string; a plurality of initially retracted packing means on said body means and responsive to fluid pressure in said passage to be expanded outwardly into sealing engagement with the conduit string to form a plurality of separated zones in the conduit string isolated from one another and straddling the perforations in the conduit string; means providing a separate flow path from said fluid passage to each of said separated zones externally of said body means; flow regulator means in each of said paths for controlling the rate of flow of fluid therethrough to each of said zones; each of said flow regulator means including normally closed valve means adapted to open when subjected to a predetermined pressure in said passage which is in excess of the pressure required to expand said packing means into sealing engagement with the conduit string; each of said flow regulator means embodying means for restricting flow of relatively high viscosity fluids through its flow path to a substantially lower volumetric rate than the volumetric rate at which relatively low viscosity fluids move through its flow path.

10. In subsurface apparatus for injecting fluid through perforations in a conduit string disposed in a well bore: rigid body means having a fluid passage and adapted to be disposed in the conduit string; means on said rigid body means for anchoring said body means in said conduit string; a plurality of individual normally retracted packing means on said body means longitudinally spaced from each other for sealing against the conduit string to form a plurality of separated zones in the conduit string between spaced individual packing means isolated from one another and straddling the perforations in the conduit string; means for expanding said plurality of packing means against the conduit string; means providing a separate flow path from said fluid passage to each of said separated zones externally of said body means; and flow regulator means in each of said paths removed from said passage for controlling the rate of flow of fluid therethrough to each of said zones.

11. In subsurface apparatus for injecting fluid through perforations in a conduit string disposed in a well bore: rigid body means having a fluid passage and adapted to be disposed in the conduit string; means on said rigid body means for anchoring said body means in the conduit string, comprising normally retracted slip means and an expander engageable with said slip means for expanding said slip means outwardly against the conduit string; a plurality of individual normally retracted packing means on said body means for sealing against the conduit string to form a plurality of separated zones in the conduit string between spaced individual packing means isolated from one another and straddling the perforations in the conduit string; means for expanding said plurality of packing means against the conduit string; means providing a separate flow path from said fluid passage to each of said separated zones externally of said body means; and flow regulator means in each of said paths removed from said passage for controlling the rate of flow of fluid therethrough to each of said zones.

12. In subsurface apparatus for injecting fluid through perforations in a conduit string disposed in a well bore: body means having a fluid passage and adapted to be disposed in the conduit string; a plurality of initially retracted packing means on said body means and responsive to fluid pressure in said passage to be expanded outwardly into sealing engagement with the conduit string to form a plurality of separated zones in the conduit string isolated from one another and straddling the perforations in the conduit string; means providing a separate flow path from said fluid passage to each of said separated zones externally of said body means; flow regulator means in each of said paths for controlling the rate of flow of fluid therethrough to each of said zones; each of said flow regulator means including normally closed valve means adapted to open when subjected to a predetermined pressure in said passage; which is in excess of the pressure required to expand said packing means into sealing engagement with the conduit string; and means for restricting upward flow of well bore fluid through said passage during downward movement of said apparatus in the well conduit.

13. In subsurface apparatus for injecting fluid through perforations in a conduit string disposed in a well bore: body means having a fluid passage and adapted to be disposed in the conduit string; a plurality of inflatable initially retracted packing means on said body means responsive to fluid pressure in said passage flowing to the interior of said packing means to expand said packing means outwardly into sealing engagement with the conduit string to form a plurality of separated zones in the conduit string isolated from one another and straddling the perforations in the conduit string; means providing a separate flow path from said fluid passage to each of said separated zones externally of said body means; flow regulator means in each of said paths for controlling the rate of flow of fluid therethrough to each of said zones; each of said flow regulator means including normally closed valve means adapted to open when subjected to a predetermined pressure in said passage which is in excess of the pressure required to expand said packing means into sealing engagement with the conduit string.

14. In subsurface apparatus for injecting fluid through perforations in a conduit string disposed in a well bore: body means having a fluid passage and adapted to be disposed in the conduit string; means on said body means for anchoring said body means in the conduit string; a plurality of inflatable initially retracted packing means on said body means responsive to fluid pressure in said passage flowing to the interior of said packing means to expand said packing means outwardly into sealing engagement with the conduit string to form a plurality of separated zones in the conduit string isolated from one another and straddling the perforations in the conduit string; means providing a separate flow path from said fluid passage to each of said separated zones externally of said body means; flow regulator means in each of said paths for controlling the rate of flow of fluid therethrough to each of said zones; each of said flow regulator means including normally closed valve means adapted to open when subjected to a predetermined pressure in said passage which is in excess of the pressure required to expand said packing means into sealing engagement with the conduit string.

15. In subsurface apparatus for injecting fluid through perforations in a conduit string disposed in a well bore: body means having a fluid passage and adapted to be disposed in the conduit string; means on said body means for anchoring said body means in the conduit string, comprising normally retracted slip means and an expander engageable with said slip means for expanding said slip means outwardly against the conduit string; a plurality of inflatable initially retracted packing means on said body means responsive to fluid pressure in said passage flowing to the interior of said packing means to be expanded outwardly into sealing engagement with the conduit string to form a plurality of separated zones in the conduit string isolated from one another and straddling the perforations in the conduit string; means providing a separate flow path from said fluid passage to each of said separated zones externally of said body means; flow regulator means in each of said paths for controlling the rate of flow of fluid therethrough to each of said zones; each of said flow regulator means including normally closed valve means adapted to open when subjected to a predetermined pressure in said passage which is in excess of the pressure required to expand said packing means into sealing engagement with the conduit string.

16. In subsurface apparatus for injecting fluid through perforations in a conduit string disposed in a well bore: body means having a fluid passage and adapted to be disposed in the conduit string; a plurality of packing means on said body means for sealing against the conduit string to form a plurality of separated zones in the conduit string isolated from one another and straddling the perforations in the conduit string; means providing a separate flow path from said fluid passage to each of said separated zones externally of said body means; flow regulator means in each of said paths for controlling the rate of flow of fluid therethrough to each of said zones; and perforating means carried by said body means between each pair of packing means for producing one or more perforations in the conduit string between each pair of packing means.

17. In subsurface apparatus for injecting fluid through perforations in a conduit string disposed in a well bore: body means having a fluid passage and adapted to be disposed in the conduit string; a plurality of packing means on said body means for sealing against the conduit string to form a plurality of separated zones in the conduit string isolated from one another and straddling the perforations in the conduit string; means providing a separate flow path from said fluid passage to each of said separated zones externally of said body means; flow regulator means in each of said paths for controlling the rate of flow of fluid therethrough to each of said zones; explosive charge perforating means carried by said body means between each pair of packing means for producing one or more perforations in the conduit string between each pair of packing means; and means for firing said explosive charge perforating means.

18. In subsurface apparatus for injecting fluid through perforations in a conduit string disposed in a well bore: body means having a fluid passage and adapted to be disposed in the conduit string; a plurality of inflatable initially retracted packing means on said body means responsive to fluid pressure in said passage flowing to the interior of said packing means to expand said packing means outwardly into sealing engagement with the conduit string to form a plurality of separated zones in the conduit string isolated from one another and straddling the perforations in the conduit string; means providing a separate flow path from said fluid passage to each of said separated zones externally of said body means; flow regulator means in each of said paths for controlling the rate of flow of fluid therethrough to each of said zones; each of said flow regulator means including throttle valve means and orifice means connected to said throttle valve means for controlling the effective flow area of said throttle valve means in response to fluid pressure drop through said orifice means, and back pressure valve means on the discharge side of said throttle valve means and orifice means for maintaining a greater pressure in said passage than in said zones to retain said packing means in sealing engagement with the conduit string.

19. In subsurface apparatus for injecting fluid through perforations in a conduit string disposed in a well bore: body means having a fluid passage and adapted to be disposed in the conduit string; a plurality of individual normally retracted packing means on said body means longitudinally spaced from each other for sealing against the conduit string to form a plurality of separated zones in the conduit string between spaced individual packing means isolated from one another and straddling the perforations in the conduit string; means for expanding said plurality of packing means against the conduit string; means providing a separate flow path from said fluid passage to each of said separated zones externally of said body means; flow regulator means in each of said paths removed from said passage for controlling the rate of flow of fluid therethrough to each of said zones; each of said flow regulator means including check valve means adapted to open when subjected to a predetermined pressure in said passage.

20. In subsurface apparatus for injecting fluid through perforations in a conduit string disposed in a well bore: body means having a fluid passage and adapted to be disposed in the conduit string; a plurality of packing means on said body means for sealing against the conduit string to form a plurality of separated zones in the conduit string isolated from one another and straddling the perforations in the conduit string; means providing a separate flow path from said fluid passage to each of said separated zones externally of said body means; flow regulator means in each of said paths for controlling the rate of flow of fluid therethrough to each of said zones; each of said flow regulator means including check valve means adapted to open when subjected to a predetermined pressure in said passage; explosive charge perforating means carried by said body means between each pair of packing means for producing one or more perforations in the conduit string between each pair of packing means; and means for firing said explosive charge perforating means.

21. In subsurface apparatus for injecting fluid through perforations in a conduit string disposed in a well bore: rigid body means having a fluid passage and adapted to be disposed in the conduit string, said body means comprising a plurality of body sections threadedly secured to each other; a plurality of individual normally retracted packing means on said body sections longitudinally spaced from each other for sealing against the conduit string to form a plurality of separated zones in the conduit string between spaced individually packing means isolated from one another and straddling the perforations in the conduit string; means for expanding said plurality of packing means against the conduit string; means providing a separate flow path from said fluid passage to each of said separated zones externally of said body sections; and flow regulator means in each of said paths removed from said passage for controlling the rate of flow of fluid therethrough to each of said zones.

22. In subsurface apparatus for injecting fluid through perforations in a conduit string disposed in a well bore: rigid body means having a fluid passage and adapted to be disposed in the conduit string, said body means comprising a plurality of body sections threadedly secured to each other; a plurality of individual and longitudinally spaced normally retracted packing means on said body sections adapted for expansion against the conduit string to form a plurality of separated zones in the conduit string between spaced individual packing means isolated from one another and straddling the perforations in the conduit string; means for expanding said plurality of packing means against the conduit string; means providing a separate flow path from said fluid passage to each of said separated zones externally of said body means; and flow regulator means in each of said paths removed from said passage for maintaining the volumetric rate of fluid flow through all of said paths substantially equal to one another.

23. In subsurface apparatus for injecting fluid through perforations in a conduit string disposed in a well bore: rigid body means having a fluid passage and adapted to be disposed in the conduit string; a plurality of individual and longitudinally spaced normally retracted packing means on said rigid body means adapted for expansion against the conduit string to form a plurality of separated zones in the conduit string between spaced individual packing means isolated from one another and straddling the perforations in the conduit string; at least one of said packing means being responsive to fluid pressure in said passage to be expanded outwardly against the conduit string; means for expanding said plurality of packing means against the conduit string; means providing a separate flow path from said fluid passage to each of said separated zones externally of said body means; and flow regulator means in each of said paths removed from said passage for maintaining the volumetric rate of fluid flow through all of said paths substantially equal to one another.

References Cited

UNITED STATES PATENTS

| | | | |
|---|---|---|---|
| 2,227,539 | 1/1941 | Dorton | 166—70 |
| 3,273,647 | 9/1966 | Briggs et al. | 166—100 |
| 3,318,381 | 5/1967 | Brandt | 166—35 |
| 2,019,418 | 10/1935 | Lang | 166—10 |
| 2,107,006 | 2/1938 | Lang | 166—10 |
| 2,141,419 | 12/1938 | Spang | 166—10 |
| 2,611,436 | 9/1952 | Carr et al. | 166—10 |
| 2,760,581 | 8/1956 | Johnston et al. | 166—55.1 |
| 3,118,501 | 1/1964 | Kenley | 166—55.1 |

FOREIGN PATENTS 633,905  1/1962  Canada.

JAMES A. LEPPINK, *Primary Examiner.*